(12) United States Patent
Iwamoto

(10) Patent No.: US 9,582,155 B2
(45) Date of Patent: Feb. 28, 2017

(54) ELECTRONIC APPARATUS, DOCUMENT DISPLAY METHOD AND COMPUTER-READABLE RECORDING MEDIUM HAVING PROGRAM RECORDED THEREON

(71) Applicant: NEC CASIO Mobile Communications, Ltd., Kawasaki-shi, Kanagawa (JP)

(72) Inventor: Masanao Iwamoto, Tokyo (JP)

(73) Assignee: NEC CORPORATION, Tokyo (JP)

(*) Notice: Subject to any disclaimer, the term of this patent is extended or adjusted under 35 U.S.C. 154(b) by 88 days.

(21) Appl. No.: 14/422,263

(22) PCT Filed: Aug. 21, 2013

(86) PCT No.: PCT/JP2013/072325
§ 371 (c)(1),
(2) Date: Feb. 18, 2015

(87) PCT Pub. No.: WO2014/030679
PCT Pub. Date: Feb. 27, 2014

(65) Prior Publication Data
US 2015/0242074 A1 Aug. 27, 2015

(30) Foreign Application Priority Data

Aug. 22, 2012 (JP) ................. 2012-183443

(51) Int. Cl.
*G06F 3/0483* (2013.01)
*G06F 3/0488* (2013.01)
(Continued)

(52) U.S. Cl.
CPC ........ *G06F 3/0483* (2013.01); *G06F 3/03547* (2013.01); *G06F 3/041* (2013.01);
(Continued)

(58) Field of Classification Search
CPC ............. G06F 3/0483; G06F 3/03547; G06F 3/04855; G06F 3/04847; G06F 3/0488;
(Continued)

(56) References Cited

U.S. PATENT DOCUMENTS

2012/0084647 A1* 4/2012 Homma ................ G06F 3/0483
715/273
2012/0176385 A1 7/2012 Gunji et al.
2012/0182310 A1 7/2012 Okada

FOREIGN PATENT DOCUMENTS

JP 2001-265481 A 9/2001
JP 2010-009104 A 1/2010
(Continued)

OTHER PUBLICATIONS

Extended European Search Report for EP Application No. EP13831080.0 dated Jun. 7, 2016.
(Continued)

*Primary Examiner* — Premal Patel

(57) ABSTRACT

A touch panel acquires position information indicating the position of contact with or approach to an operation surface in every period divided by predetermined intervals. An action judging unit judges whether or not an action by contact with or approach to the operation surface of the touch panel is a first predetermined action. An operation determining unit determines a start page of automatic page-turning in which display pages of a document to be displayed are changed from one page to another in sequence on the basis of the position information and the information indicating the history of the position information when the action judging unit judges that action by the contact with or the approach to the operation surface of the touch panel is the first predetermined action.

10 Claims, 17 Drawing Sheets

(51) Int. Cl.
    *G06F 3/041*     (2006.01)
    *G06F 3/0354*    (2013.01)
    *G06F 3/0485*    (2013.01)
    *G06F 3/0484*    (2013.01)
(52) U.S. Cl.
    CPC ........ *G06F 3/0488* (2013.01); *G06F 3/04847*
            (2013.01); *G06F 3/04855* (2013.01); *G06F
                2203/04101* (2013.01); *G06F 2203/04808*
                                            (2013.01)
(58) Field of Classification Search
    CPC ........... G06F 3/041; G06F 2203/04808; G06F
                                            2203/04101
    See application file for complete search history.

(56)            References Cited

FOREIGN PATENT DOCUMENTS

JP      2011-039843  A     2/2011
JP      2012-064092  A     3/2012
JP      2012-079156  A     4/2012
WO      2011/111552  A1    9/2011
WO      2012/044363  A1    4/2012

OTHER PUBLICATIONS

International Search Report for PCT Application No. PCT/JP2013/072325, mailed on Nov 12, 2013.

* cited by examiner

| TOTAL NUMBER OF PAGES | PAGE-TURNING INTERVALS (SECONDS) |
|---|---|
| 0 – 100 | 3 |
| 101 – 200 | 2.5 |
| 201 – 300 | 2 |
| 301 – 400 | 1.5 |
| ... | ... |

251

| DIRECTION | MOVEMENT DISTANCE (mm) | AMOUNT OF SPEED CHANGE (SECONDS) |
|---|---|---|
| + | 2 – 4.9 | – 0.3 |
| + | 5 – 7.9 | – 0.6 |
| + | 8 – | – 1.2 |
| – | 2 – 4.9 | + 0.3 |
| – | 5 – 7.9 | + 0.6 |
| – | 8 – | + 1.2 |

ELECTRONIC APPARATUS, DOCUMENT DISPLAY METHOD AND COMPUTER-READABLE RECORDING MEDIUM HAVING PROGRAM RECORDED THEREON

This application is a National Stage Entry of PCT/JP2013/072325 filed on Aug. 21, 2013, which claims priority from Japanese Patent Application 2012-183443 filed on Aug. 22, 2012, the contents of all of which are incorporated herein by reference, in their entirety.

TECHNICAL FIELD

The present invention relates to an electronic apparatus, a document display method, and a computer-readable recording medium on which a program is recorded.

BACKGROUND ART

As electronic documents have come into widespread use in recent years, more and more people are reading electronic documents using electronic document readers. Many of the electronic document readers are equipped with a touch panel in which display functionality and input functionality are combined together.

When reading an electronic document, a user is required to perform an action, such as touching an icon, in order to turn displayed pages (to change displayed pages). Accordingly, actions are complicated by the user's eye movement. With the aim of eliminating the complication, various methods have been proposed about the page changing of the electronic document reader.

For example, PTL 1 discloses a display apparatus in which, when a given turning action is performed, a preset number of pages are turned to display. The number of pages turned at the same time is set by a distance over which multi-touching fingers have slid.

PTL 2 discloses an electronic book viewer which displays a cursor indicating the current read position in order to prevent a user from reading a wrong line or row. The electronic book viewer includes a page bar which visually shows where the currently displayed page is located in an electronic book. When a point displayed on the page bar is slid, pages are turned correspondingly.

CITATION LIST

Patent Literature

[PTL 1] Japanese Laid-Open Patent Publication No. 2012-064092
[PTL 2] Japanese Laid-Open Patent Publication No. 2010-009104

SUMMARY OF INVENTION

Technical Problem

When reading a book, the reader may sometimes read one page, read a subsequent page, and then return to the original page or may read one page, read a previous page, then return to the original page to resume reading at the original page. In the case of a non-electronic book, the reader can readily return to an original page by putting a finger between pages. However, both of the electronic document readers disclosed in PTL 1 and PTL 2 have a problem that operations for returning to an original page are complicated because in order to return to the original page after turning pages, the reader has to memorize or jot the page and then return to the page by checking through pages.

The present invention has been made in light of the circumstances described above and an object of the present invention is to provide an electronic apparatus, a document display method and a computer-readable recording medium on which a program is recorded that enable an original page to be redisplayed with a simple action after turning pages.

Solution to Problem

To achieve the object described above, an electronic apparatus according to a first aspect of the present invention includes:

a touch panel which includes a display function and a position input function of acquiring position information indicating the position of contact with or approach to an operation surface in every period divided by predetermined intervals;

a storage unit which stores the position information acquired by the position input function and information indicating a history of the position information;

a display control unit which controls the touch panel so as to display a document to be displayed;

an action judging unit which judges whether or not an action by the contact with or the approach to the operation surface of the touch panel is a first predetermined action that changes a distance between the plurality of points on the basis of position information indicating each of the plurality of points and information indicating the history of the position information when the position input function acquires position information indicating a plurality of points including contact with or approach to a predetermined position; and an operation determining unit which obtains the position of one of the plurality of points before a change in the distance between the plurality of points on the basis of position information and information indicating the history of the position information stored in the storage unit when the action judging unit judges that the action by the contact with or the approach to the operation surface of the touch panel is the first predetermined action, and determines a start page of automatic page-turning changing display pages of the document to be displayed from one page to another in sequence on the basis of the amount of the entire document to be displayed and the obtained position of the one point;

wherein when the action judging unit judges that the action by the contact with or approach to the operation surface of the touch panel is the first predetermined action, the display control unit controls the touch panel so as to display the document to be displayed in sequence starting at the start page of automatic page-turning determined by the operation determining unit.

To achieve the object described above, a document display method according to a second aspect of the present invention includes:

an acquisition step of acquiring position information indicating the position of contact with or approach to an operation surface of a touch panel in every period divided by predetermined intervals;

a storage step of storing the position information acquired in the acquisition step and information indicating a history of the position information;

an action judging step of judging whether or not an action by the contact with or the approach to the operation surface of the touch panel is a first predetermined action that changes a distance between the plurality of points on the basis of position information indicating each of the plurality of points and information indicating the history of the position information when position information indicating a plurality of points including contact with or approach to a predetermined position is acquired in the acquisition step;

an operation determining step of obtaining the position of one of the plurality of points before a change in the distance between the plurality of points on the basis of position information and information indicating the history of the position information stored in the storage step when it is judged in the action judging step that the action by the contact with or the approach to the operation surface of the touch panel is the first predetermined action, and determining a start page of automatic page-turning changing display pages of the document to be displayed from one page to another in sequence on the basis of the amount of the entire document to be displayed and the obtained position of the one point; and when it is judged in the action judging step that the action by the contact with or approach to the operation surface of the touch panel is the first predetermined action, a step of causing the touch panel to display the display pages of the document to be displayed in sequence starting at the start page determined in the operation determining step.

In order to achieve the object described above, a program recorded on a computer-readable recording medium according to a third aspect of the present invention causes a computer to implement:

a position input function of acquiring position information indicating the position of contact with or approach to an operation surface of a touch panel in every period divided by predetermined intervals;

a display function of displaying a document to be displayed on the touch panel;

a storage function of storing the position information acquired by the position input function and information indicating a history of the position information;

an action judging function of judging whether or not an action by the contact with or the approach to the operation surface of the touch panel is a first predetermined action that changes a distance between the plurality of points on the basis of position information indicating each of the plurality of points and information indicating the history of the position information when the position input function acquires position information indicating a plurality of points including contact with or approach to a predetermined position is acquired;

an operation determining function of obtaining the position of one of the plurality of points before a change in the distance between the plurality of points on the basis of position information and information indicating the history of the position information stored by the storage function when the action judging function judges that the action by the contact with or the approach to the operation surface of the touch panel is the first predetermined action, and determining a start page of automatic page-turning changing display pages of the document to be displayed from one page to another in sequence on the basis of the amount of the entire document to be displayed and the obtained position of the one point; and when the action judging function judges that the action by the contact with or approach to the operation surface of the touch panel is the first predetermined action, a function of causing the touch panel to display the display pages of the document to be displayed in sequence starting at the start page determined by the operation determining function.

Advantageous Effects of Invention

According to the present invention, it is possible to estimate a page to be displayed, as in a printed book, by contact or approach operation to a touch panel, turn pages from the estimated page automatically, and redisplay the original page after turning pages by a simple action without insertion of a bookmark.

DESCRIPTION OF EMBODIMENTS

Electronic apparatus according to exemplary embodiments of the present invention will be described below by taking an electronic document reader as an example.

First Exemplary Embodiment

An electronic document reader 100 according to a first exemplary embodiment will be described below.

Figure 1:
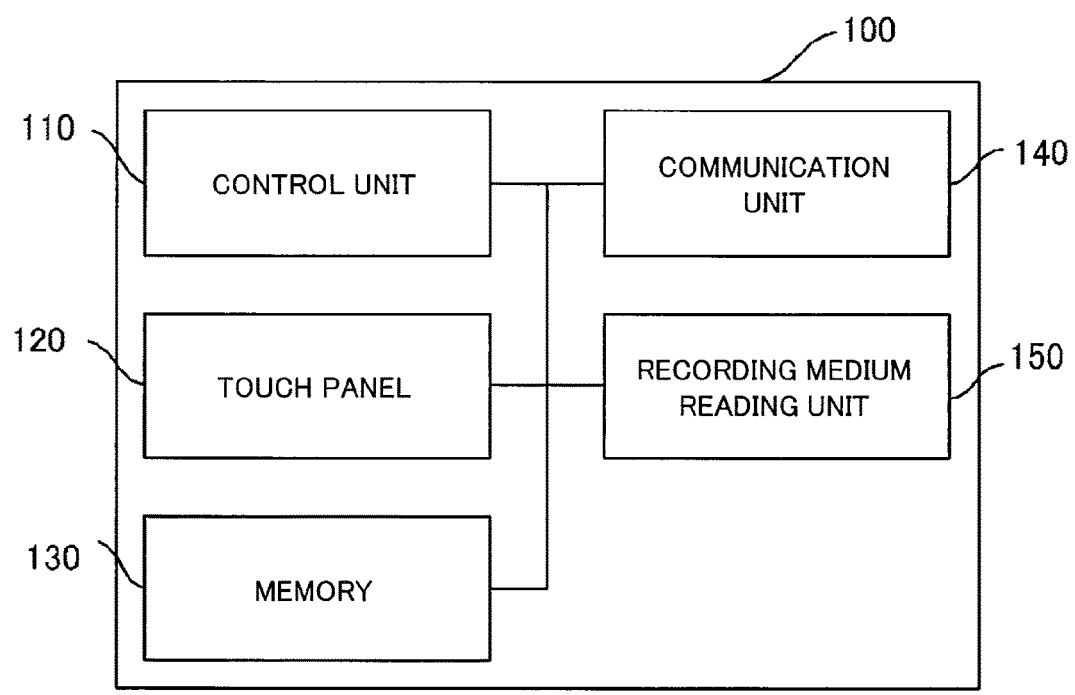
FIG. 1 is a block diagram illustrating a hardware configuration of an electronic document reader according to a first exemplary embodiment.

The electronic document reader 100 includes a function of displaying electronic documents. The electronic document reader 100 includes a control unit 110, a touch panel 120, a memory 130, a communication unit 140 and a recording medium reading unit 150 as illustrated in FIG. 1.

The control unit 110 includes a CPU (Central Processing Unit), a work memory and other components.

The CPU executes a program stored in the memory 130 and controls processes on the electronic document reader 100, such as display of pages of an electronic document, and operation of automatic page-turning, for example. The work memory stores data, and an operation program necessary for operations of the CPU.

Figure 2A:
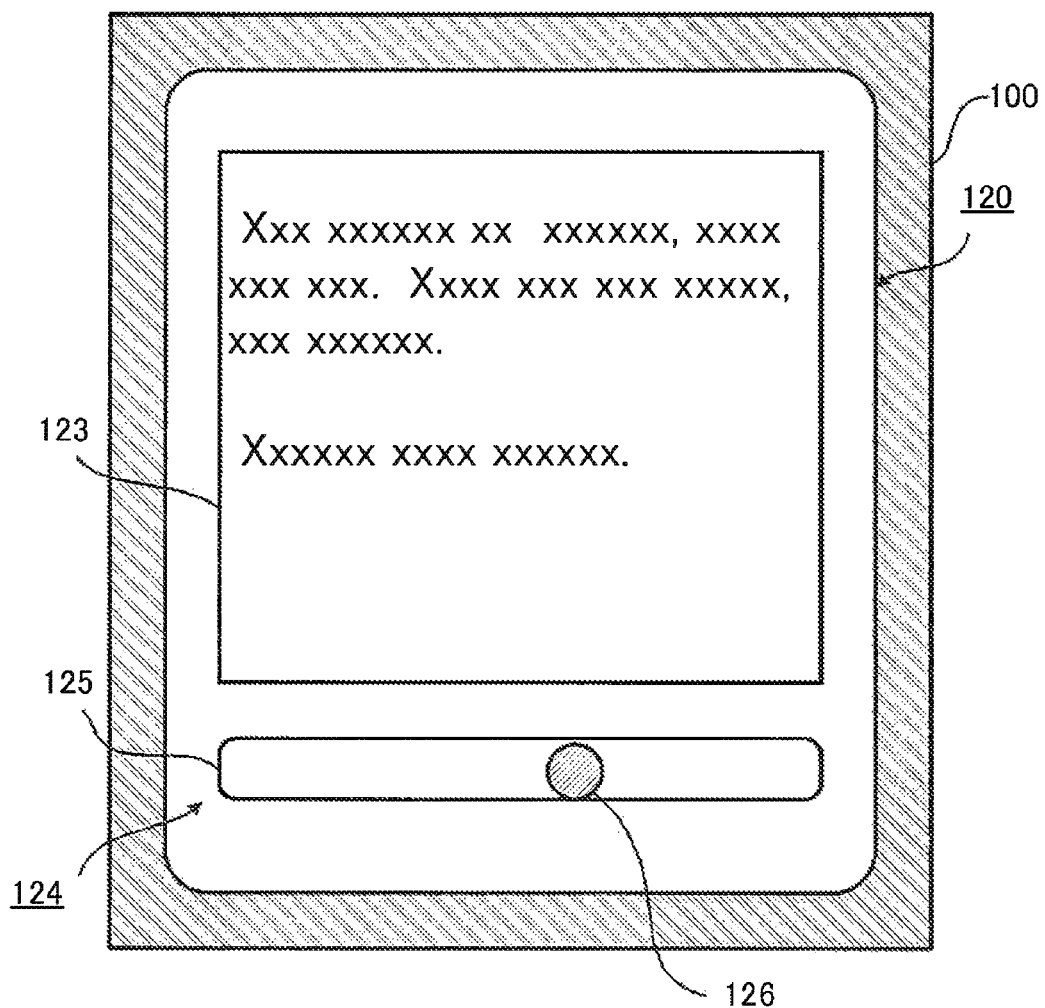
FIG. 2A is a diagram illustrating an example of a touch panel of the electronic document reader according to the first exemplary embodiment.
Figure 2B:
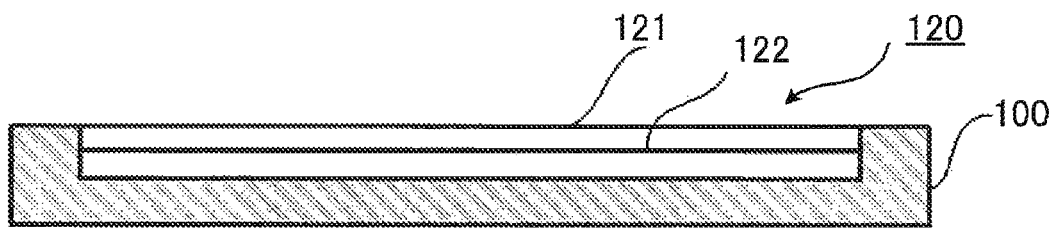
FIG. 2B is a diagram illustrating an example of a touch panel of the electronic document reader according to the first exemplary embodiment.

The touch panel 120 serves as an input device and a display device of the electronic document reader 100 and is disposed at the front of the electronic document reader 100 as illustrated in FIGS. 2A and 2B. As illustrated in FIG. 2B, the touch panel 120 includes a contact position detecting unit 121, and a display unit 122 disposed on the rear surface of the contact position detecting unit 121.

The contact position detecting unit 121 includes a contact surface and, when detecting contact of a user's finger or the like with the contact surface, determines the position of a contacted point (hereinafter referred to as a contact point) and acquires the coordinate of the position. The contact position detecting unit 121 includes the function of detecting a plurality of contact points contacted at the same time.

The display unit 122 is configured by a liquid-crystal display device, or an organic EL (Electro-Luminescence) panel, etc., and displays an electronic document, etc. by the control of the control unit 110. The display unit 122 includes a document display region 123 and an input interface display region 124 as illustrated in FIG. 2A. The display unit 122 displays an electronic document in the document display region 123 as illustrated in FIG. 2A.

The display unit 122 displays an input interface configured by a scrollbar 125 and a pointer 126 in the input interface display region 124.

The input interface is an interface for operating and controlling a document displayed in the document display region 123. The length of the entire scrollbar 125 indicates a whole amount of the display target document. The pointer 126 indicates the position of the displayed page relative to the whole display target document. The input interface also accepts a command to change the page to display. This will be detailed later.

The memory 130 illustrated in FIG. 1 stores the various programs and data for controlling operations of the control unit 110, and data of a document to be displayed.

The communication unit 140 sends and receives data between the electronic document reader 100 and another communication apparatus (not depicted).

The recording medium reading unit 150 reads data from a recording medium such as a flash memory.

A functional configuration implemented by the hardware configuration described above will be described next with reference to FIG. 3. Note that the following description will focus on a characteristic functional configuration.

Functionally, the electronic document reader 100 includes a display control unit 210, a touch panel 220, an action judging unit 230, an operation determining unit 240 and a storage unit 250.

The display control unit 210 controls the touch panel 220 to display a document to be displayed. For example, when the operation determining unit 240 determines a page to be displayed, the display control unit 210 retrieves data corresponding to the page from the storage unit 250, generates an image on the basis of the retrieved data, and outputs the generated image to the touch panel 220. As a hardware unit, the display control unit 210 is implemented by the control unit 110.

The touch panel 220 includes a position input function of acquiring the coordinate of a contact point (hereinafter referred to as contact point information) at unit time intervals. The touch panel 220 sequentially outputs the acquired coordinates of contact points and the acquisition times to the storage unit 250. The touch panel 220 further includes a display function which displays data electronic documents and the input interface described above, etc. in accordance with the control of the display control unit 210. As hardware, the touch panel 220 is implemented by the control unit 110, the touch panel 120 and the memory 130.

The action judging unit 230 judges whether or not an action performed on the touch panel 220 by a user is a predetermined action. Specifically, the action judging unit 230 judges whether or not the predetermined action has been performed based on a sequence of pieces of contact point information and their acquisition times which are stored in the storage unit 250. When the action judging unit 230 judges that the predetermined action has been performed, the action judging unit 230 outputs information identifying the action to the operation determining unit 240 and the storage unit 250. For example, the action judging unit 230 judges that an action that slides the pointer 126 on the scrollbar 125 has been performed. As hardware, the action judging unit 230 is implemented by the control unit 110 and the memory 130.

The action judging unit 230 may judge about movement of a contact point as described below based on a sequence of pieces of contact point information and their acquisition times which are stored in the storage unit 250.

For example, if a contact is detected at coordinate (x1, y1) at time t1, a contact point is not detected at the coordinate (x1, y1) at time t2 at which a predetermined time has passed from time t1, and a contact point is detected at coordinate (x2, y2) by which a distance with the coordinate (x1, y1) is in the predetermined range, the action judging unit 230 may judge that the contact point detected at the coordinate (x1, y1) at time t1 has moved to the coordinate (x2, y2) until time t2 while keeping the contact.

Furthermore, for example, if a contact point is detected at the coordinate (x1, y1) at time t1, the contact point is not detected at the coordinate (x1, y1) at time t2 at which a predetermined time has passed from time t1, and a contact point is detected at coordinate (x10, y10) by which a distance with the coordinate (x1, y1) is not in the predetermined range, the action judging unit 230 may judge that the contact point detected at the coordinate (x1, y1) at time t1 and the contact point detected at the coordinate (x10, y10) at time t2 are contact points of different contacts.

The action judging unit 230 may judge that a contact point is standing still based on a sequence of pieces of contact point information and their acquisition times which are stored in the storage unit 250 as described below.

For example, if a contact is detected at the coordinate (x1, y1) at time t1 and then a contact point is detected at the coordinate (x1, y1) at time t2 a predetermined period of time after time t1, the operation judging unit 230 may judge that the contact points detected at the coordinate (x1, y1) at time t1 and time t2 are the same, standing still contact point.

Alternatively, if the coordinate of a contact point detected at time t1 is (x1, y1), the coordinate of a contact point detected at time t2 is (x1', y1'), and the distance between the coordinate (x1, y1) and the coordinate (x1', y1') is less than a predetermined distance, the action judging unit 230 may judge that the contact point detected at the coordinate (x1, y1) at time t1 and the contact point detected at the coordinate (x1', y1') at time t2 are the same, standing still contact points.

The operation determining unit 240 determines an operation to be executed by the electronic document reader 100 in response to a user action. Specifically, the operation determining unit 240 determines an operation to be executed by the electronic reader 100 on the basis of information about judgment made by the action judging unit 230 about an action and information in which a predetermined action stored in the storage unit 250 is associated beforehand with an operation to be executed by the electronic document reader 100 when the predetermined action has been performed. The operation determining unit 240 is implemented by the control unit 110 and the memory 130.

An example will be described below in which the operation determining unit 240 determines an operation to be executed by the electronic document reader 100 on the basis of information about judgment made by the action judging unit 230 about an action.

Figure 4:
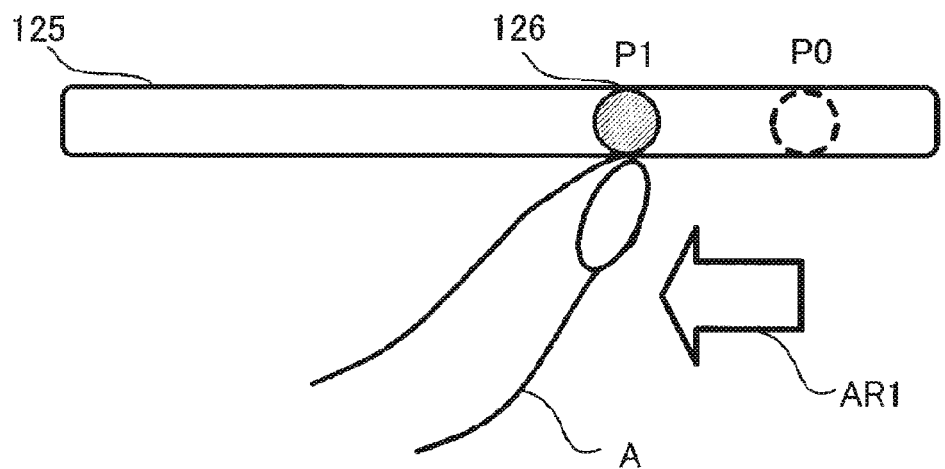
FIG. 4 is a diagram illustrating an example of operating a pointer.

For example, assume that after touching position P0 (a point at which the pointer 126 is located) on the scrollbar 125 as illustrated in FIG. 4, the user moves the contact point to position P1 on the scrollbar 125 as indicated by arrow AR1. Then the action judging unit 230 retrieves a change in contact point information associated with the action from the storage unit 250 and determines that the action performed on the touch panel 220 is the action (predetermined action) of sliding the pointer 126 on the scrollbar 125.

The operation determining unit 240 obtains the distance between position P0 and position P1, which is the distance over which the contact point has moved, on the basis of the information indicating the judgment made by the action judging unit 230, determines a page to be displayed on the touch panel 220 on the basis of the obtained distance, and outputs information about the determined operation to be executed to the storage unit 250. The operation determining unit 240 controls the display control unit 210 on the basis of the information about the determined operation to be executed. The display control unit 210 updates the display on the touch panel 220 in accordance with the control by the operation determining unit 240. Thus a page according to the user's action is displayed on the touch panel 220.

Furthermore, the operation determining unit 240 determines to update the display of the pointer 126 in accordance with movement of a contact point while the contact point is moving, and outputs information concerning the determined operation to be executed to the storage unit 250. The operation determining unit 240 controls the display control unit 210 on the basis of the information concerning the determined operation to be executed. The display control unit 210 updates the display on the touch panel 220 in accordance with the control by the operation determining unit 240. Thus the display of the pointer 126 moves on the scrollbar 125 in accordance with movement of the contact point while the contact point is moving.

When the contact point comes to rest, the operation determining unit 240 obtains, on the basis of the position of the contact point, the page number being displayed and outputs the page number to the storage unit 250.

A process performed by the action judging unit 230 and the operation determining unit 240 for automatic page-turning that is characteristic of this exemplary embodiment will be described below.

In this exemplary embodiment, the electronic document reader 100 automatically changes display from one page to another in sequence from a start page to an end page indicated by a command by a predetermined contact action (hereinafter referred to as automatic page-turning).

Note that pages of the document to be displayed are turned from left to right.

Automatic page-turning that is characteristic of this exemplary embodiment is instructed by the following action.

When a user wants to automatically turn a plurality of pages of a document displayed on the electronic document reader 100 in sequence, the user can command to perform forward automatic page-turning by a pinch-out action described below.

Figure 5:
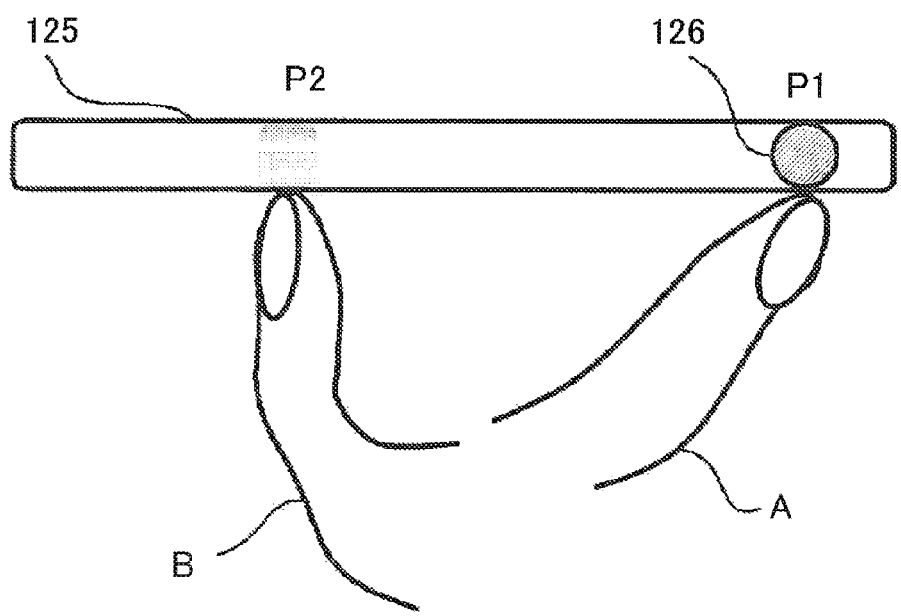
FIG. 5 is a diagram illustrating a predetermined action according to the first exemplary embodiment.
Figure 6:
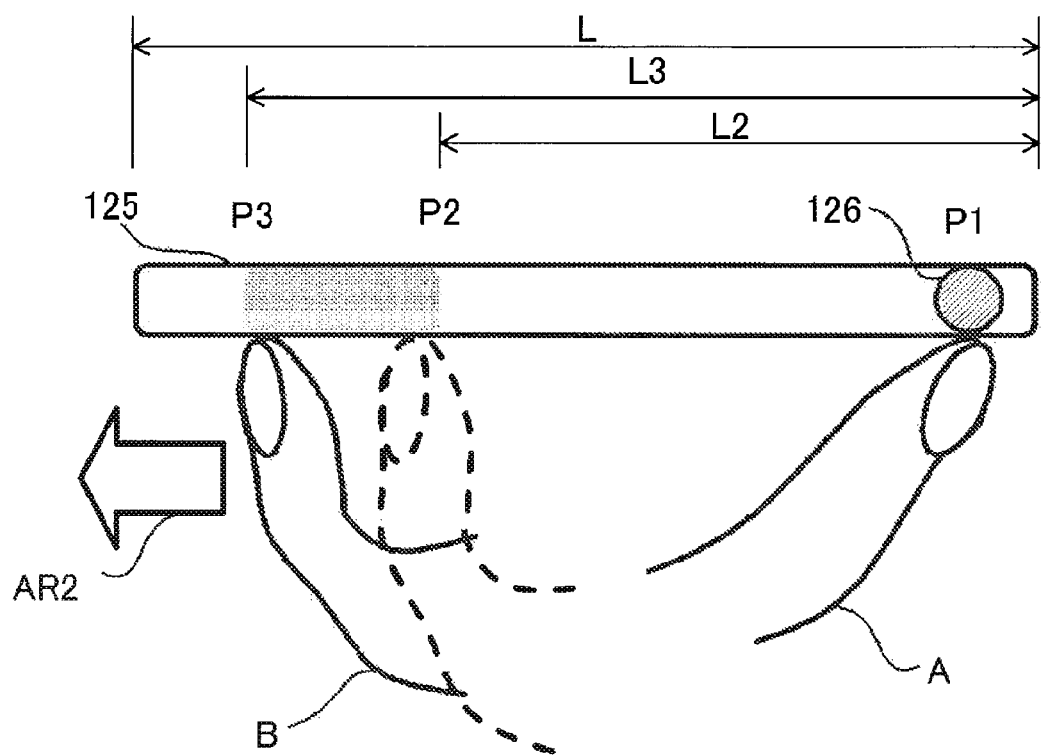
FIG. 6 is a diagram illustrating a pinch-out action according to the first exemplary embodiment.

As illustrated in FIG. 5, the user presses and holds position P1 in which the pointer 126 is displayed with finger A and touches position P2 on the scrollbar 125 with finger B while keeping finger A at P1. Then as illustrated in FIG. 6, the user slides finger B along the scrollbar 125 in the direction indicated by arrow AR2 so as to increase the distance between fingers A and B while fixing finger A and stops at position P3. In other words, the user slides finger B from position P2 to position P3.

When the action described above has been performed, the action judging unit 230 judges that a predetermined action corresponding to a command to perform forward automatic page-turning has been performed. The operation determining unit 240 obtains the page corresponding to position P2 as the start page of automatic page-turning, obtains the page corresponding to position P3 as the end page, and determines the operation of turning pages from the start page to the end page in sequence as the operation to be executed. The operation determining unit 240 outputs information concerning the operation to be executed to the storage unit 250.

The display control unit 210 updates the display on the touch panel 220 in accordance with the control by the operation determining unit 240. Thus, forward automatic page-turning is executed.

Furthermore, the operation determining unit 240 stores the page currently being displayed, i.e. the page indicated by the position of the pointer 126, for the purpose of redisplaying the currently displayed page after the automatic page-turning is stopped.

When the user wants to automatically turn a plurality of pages of the document displayed on the electronic document reader 100 in sequence in the direction opposite to the direction in the example described above, the user can command to perform backward automatic page-turning by a pinch-in action described below.

Figure 7:
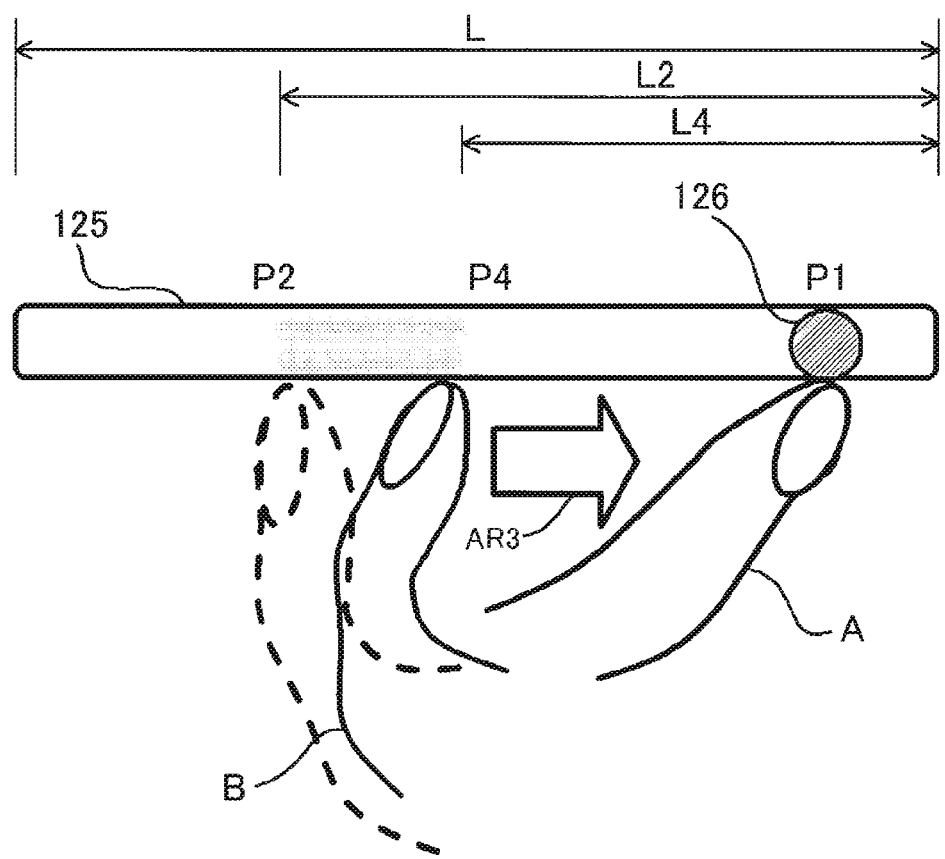
FIG. 7 is a diagram illustrating a pinch-in action according to the first exemplary embodiment.

As illustrated in FIG. 5, the user presses and holds position P1 in which the pointer 126 is displayed with finger A and touches position P2 on the slidebar 125 with finger B while keeping finger A at P1. Then as illustrated in FIG. 7, the user slides finger B along the scrollbar 125 in the direction indicated by arrow AR3 so as to decrease the distance between fingers A and B while fixing finger A and stops at position P4. In other words, the user slides finger B from position P2 to position P4.

When the action described above has been performed, the action judging unit 230 judges that a predetermined action corresponding to a command to perform backward automatic page-turning has been performed. The operation determining unit 240 obtains the page corresponding to position P2 as the start page of automatic page-turning, obtains the page corresponding to position P4 as the end page, and determines the operation of turning pages from the start page to the end page in sequence as the operation to be executed. The operation determining unit 240 outputs information concerning the determined operation to be executed to the storage unit 250.

The display control unit 210 updates the display on the touch panel 220 in accordance with the control by the operation determining unit 240. Thus, backward automatic page-turning is started.

Furthermore, the operation determining unit 240 stores the page currently being displayed, i.e. the page indicated by the position of the pointer 126, for the purpose of redisplaying the currently displayed page after the automatic page-turning is stopped.

When the user wants to stop automatic page-turning during an automatic page-turning operation and return to the page the user was viewing immediately before the start of the automatic page-turning, the user performs the following action.

Figure 8:
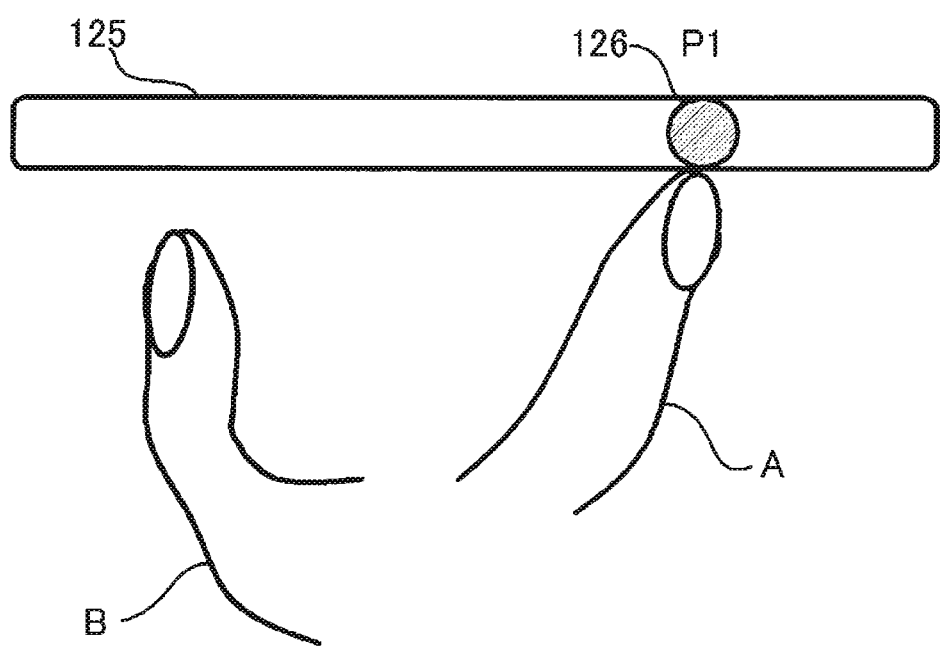
FIG. 8 is a diagram illustrating a pinch release action according to the first exemplary embodiment.

As illustrated in FIG. 8, the user takes off finger B while touching the touch panel with finger A in contact with the pointer 126 (hereinafter the action is referred to as a pinch release action).

When the action described above is performed, the action judging unit 230 determines that a predetermined action corresponding to a command to stop automatic page-turning and redisplay the page displayed before the start of the automatic page-turning has been performed. On the basis of the judgment by the action judging unit 230 and the coordinates of the contact points and their acquisition times which are stored in the storage unit 250, the operation determining unit 240 determines to stop the automatic page-turning and redisplay the page displayed before the start of the automatic page-turning. The operation determining unit 240 controls the display control unit 210 on the basis of information concerning the determined operation to be executed. The display control unit 210 updates the display on the touch panel 220 in accordance with the control by the operation determining unit 240.

In this way, the automatic page-turning is stopped and the page displayed before the start of the automatic page-turning is displayed.

A method for determining the start and end pages of automatic page-turning will now be described with reference to FIG. 6.

In order to facilitate understanding, the total number of pages, which is the total amount of a document to be displayed, is denoted by T, the length of the scrollbar 125 is denoted by L, the distance between position P2 of a contact point of a pinch-out action and the right end of the scrollbar 125 is denoted by L2, and the distance between position P3 and the right end of the scrollbar 125 is denoted by L3.

First, the operation determining unit 240 calculates the number of pages T/L that corresponds to the unit length of the scrollbar based on the total number of pages T of the electronic document and the length L of the scrollbar. The operation determining unit 240 then multiplies the number of pages per unit length T/L by the distance L2 to obtain the start page ep. The operation determining unit 240 multiplies the calculated number of pages per unit length T/L by the distance L3 to obtain the end page ep. In other words, the operation determining unit 240 obtains start page sp=T/L*L2 and end page ep=T/L*L3. The operation determining unit 240 stores these values in the storage unit 250.

The operation determining unit 240 determines the operation of turning pages in sequence from page T/L*L2 to page T/L*L3.

For instance, if the total number of pages of a document to be displayed is 150, the length of the scrollbar 125 is 10 centimeters, L2 is 5 centimeters, and L3 is 7 centimeters, then the start page sp=150/10*5=page 75 and the end page ep=150/10*7=page 105. In this case, the pages from page 75 to page 105 of the document to be displayed are automatically turned forward and displayed in sequence.

In the pinch-in action illustrated in FIG. 7, let the total number of pages be denoted by T, the length of the scrollbar 125 be denoted by L, the distance between position P2 and the right end of the scrollbar 125 be denoted by L2, and the distance between position P4 and the right end of the scrollbar 125 be denoted by L4. In a similar way to that for the pinch-out action, the operation determining unit 240 calculates start page sp=T/L*L2 and end page ep=T/L*L4.

For instance, if the total number of pages is 150, the length of the scrollbar 125 is 10 centimeters, L2 is 5 centimeters, and L4 is 3 centimeters, then the start page sp=150/10*5=page 75 and the end page ep=150/10*3=page 45. In this case, the pages from page 75 to page 45 of the document to be displayed are automatically turned backward and displayed in sequence.

The storage unit 250 stores data of the document to be displayed, the total number of pages T, which is the total amount of the document to be displayed, the page number of the page currently being displayed, various parameters L of the operation interface and the like. The storage unit 250 also stores information in which predetermined actions and operations that are to be executed by the electronic document reader 100 when the predetermined actions are performed are associated with each other beforehand.

Furthermore, each time information is provided from the units described above, the storage unit 250 stores the information. For example, the storage unit 250 stores contact point information acquired by the touch panel 220 and the time at which the contact point information was acquired in association with each other. The storage unit 250 also stores information about operation to be executed, including the start page sp, the end page ep, the return page and the like, determined by the operation determining unit 240.

The storage unit 250 is implemented by the memory 130.

An operation of the electronic document reader 100 having the configuration described above will be described below.

The following description will focus on an automatic page-turning operation and an operation to stop the automatic page-turning on the electronic document reader 100 that are specific to this exemplary embodiment.

When user specifies a given document by performing a prescribed contact action and then specifies a page to be displayed, the touch panel 220 detects a contact point and stores the coordinate indicating the position of the contact point and the time of acquisition of the coordinate in the storage unit 250.

The action judging unit 230 judges these actions based on a history of the position information stored in the storage unit 250. The operation determining unit 240 determines display of the specified page in the display of the specified document.

In response to the determination, the display control unit 210 retrieves the specified electronic document from the storage unit 250 and displays a page image in the document display region 123 and the scrollbar 125 and the pointer 126 in the input interface display region 124.

Assume that then the user performs the pinch-out action or the pinch-in action described above to command to execute automatic page-turning.

The touch panel 220 detects a contact point on the display range (hereinafter referred to as the command detection region) of the input interface display region 124 every unit time. The touch panel 220 sequentially stores the coordinates of the positions in which the contact points have been detected and the time of acquisition of the coordinates in the storage unit 250.

Figure 9:
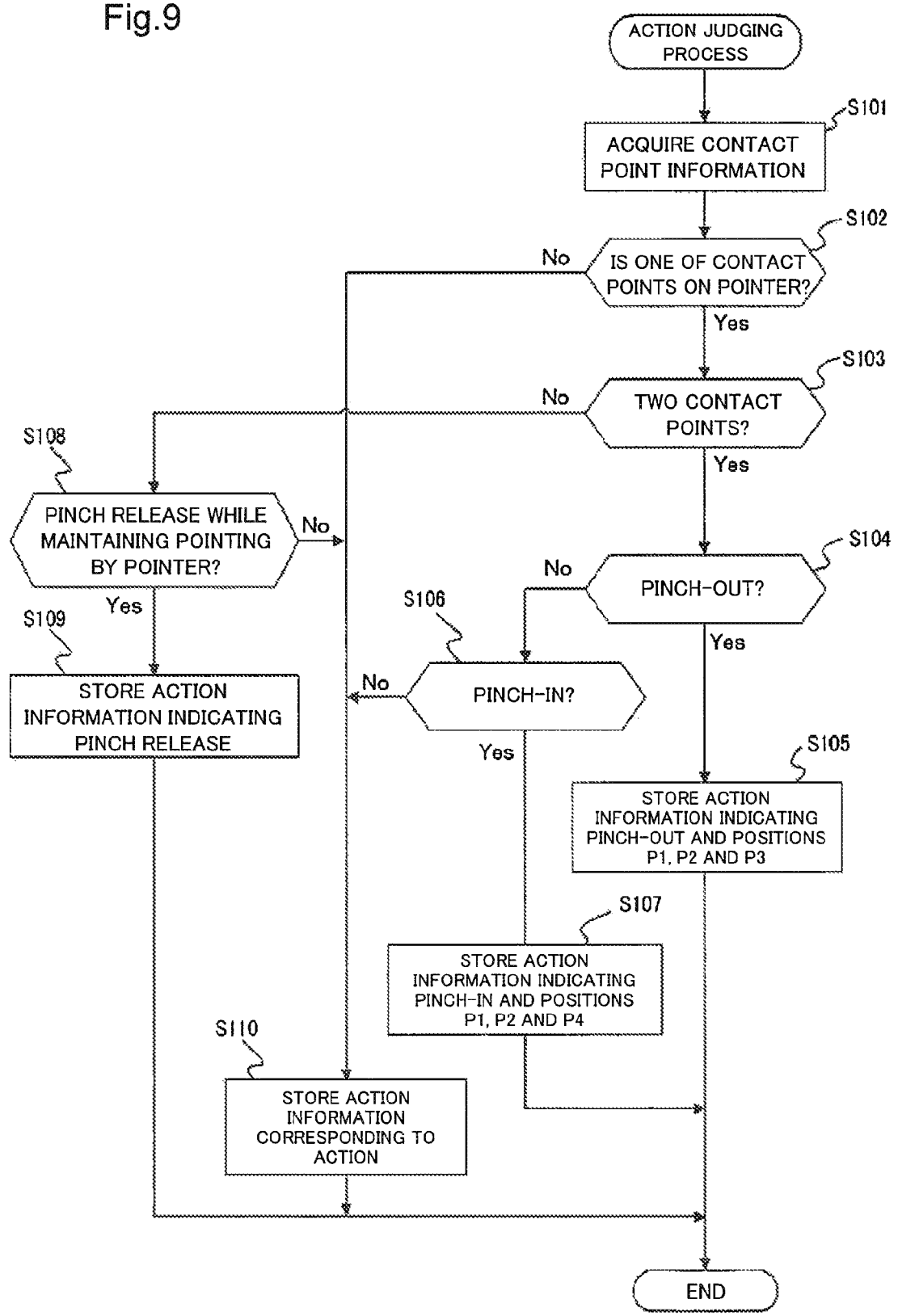
FIG. 9 is a flowchart illustrating an action judging process according to the first exemplary embodiment.

On the other hand, the action judging unit 230 executes an action judging process illustrated in FIG. 9 when contact point information in the command detection region is updated. The action judging process may be executed periodically, for example, after the startup of the electronic document reader 100.

First, the action judging unit 230 acquires contact point information in the command detection region that is stored in the storage unit 250 (step S101).

The action judging unit 230 judges whether or not there is a contact point contacting the pointer 126 on the basis of the contact point information (step S102).

When it is judged that one of the contact points is on the pointer 126 (step S102: Yes), the action judging unit 230 judges whether or not the number of the contact points on the scrollbar 125 is two in the acquired contact point information (step S103).

When the action judging unit 230 judges at step S103 that the number of the contact points on the scrollbar 125 is two (step S103: Yes), the action judging unit 230 judges whether or not the action is a pinch-out action (step S104). If the action judging unit 230 judges that the action is a pinch-out action (step S104: Yes), the action judging unit 230 stores the action information indicating that the action is a "pinch-out with pointing by the pointer" and positions P1, P2 and P3 in the storage unit 250 (step S105).

When the action judging unit 230 judges at step S104 that the action is not a pinch-out action (step S104: No), the action judging unit 230 then judges whether or not the action is a pinch-in action (step S106). If the action judging unit 230 judges that the action is a pinch-in action (step S106: Yes), the action judging unit 230 stores action information indicating that the action is a "pinch-in with pointing by the pointer" and positions P1, P2 and P4 in the storage unit 250 (step S107).

When the action judging unit 230 judges at step S106 that the action is not a pinch-in action (step S106: No), the action judging unit 230 stores action information corresponding to the action in the storage unit 250 (step S110).

On the other hand, when the action judging unit 230 judges that the number of the contact points on the scrollbar 125 is not two (step S103: No), the action judging unit 230 judges whether or not the action is a pinch release action (step S108). When the action judging unit 230 judges that the action is the pinch release action (step S108: Yes), the action judging unit 230 stores action information indicating a "pinch release action with pointing by the pointer" in the storage unit 250 (step S109).

If the action judging unit 230 judges the action is not a pinch release action (step S108: No), the action judging unit 230 stores action information corresponding to the action in the storage unit 250 (step S110).

Furthermore, when the action judging unit 230 judges that there is not a contact point on the pointer 126 (step S102: No), the action judging unit 230 stores action information corresponding to the judgment about the action in the storage unit 250 (step S110).

The action judging unit 230 repeats the action judging process described above periodically, for example.

Figure 10:
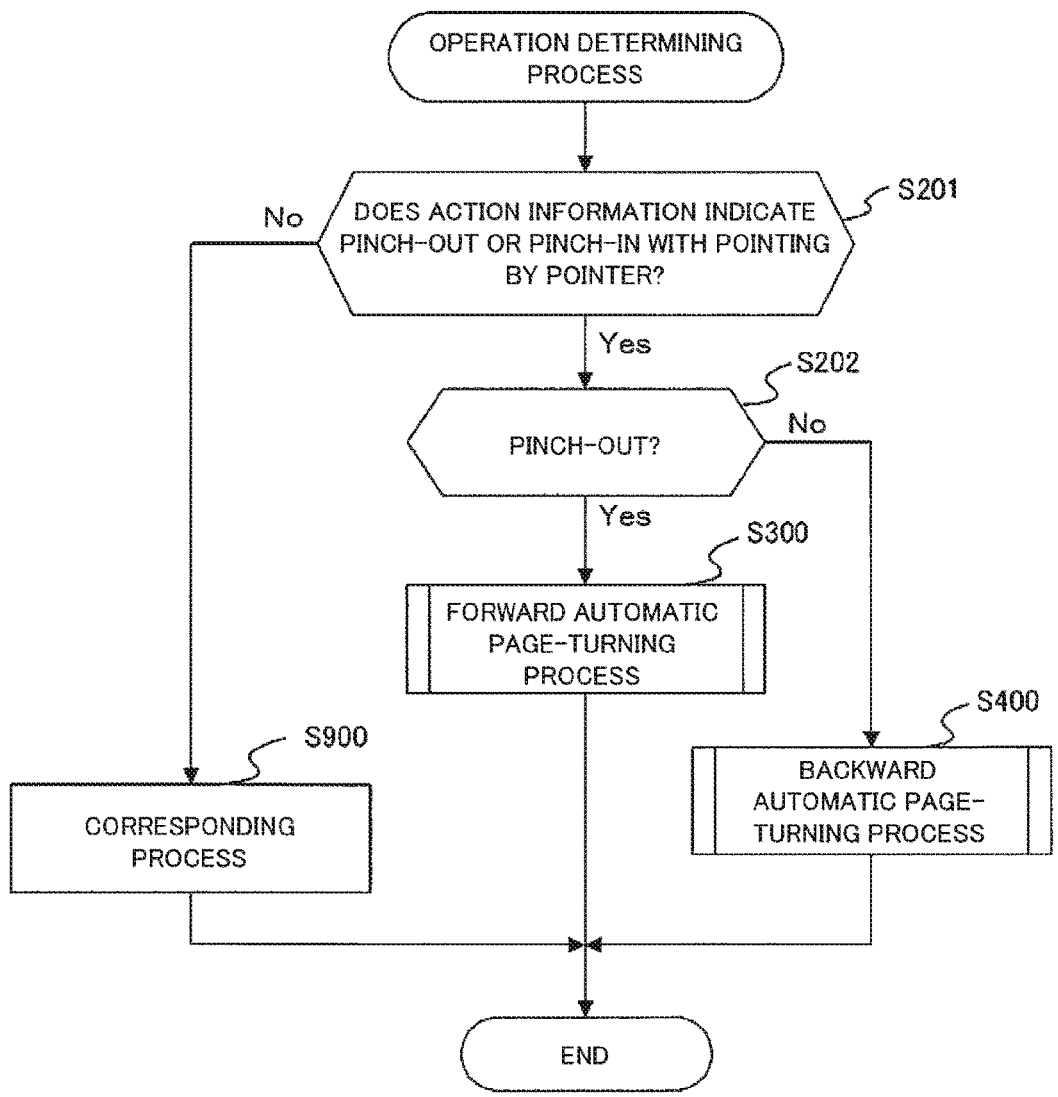
FIG. 10 is a flowchart illustrating an operation determining process according to the first exemplary embodiment.

On the other hand, the operation determining unit 240 starts an operation determining process illustrated in FIG. 10 when the action judging unit 230 stores action information to the storage unit 250 in the action judging process described above. By the operation determining process, the operation determining unit 240 determines what kind of command has been input on the basis of the action information stored in the action judging process executed by the action judging unit 230, and determines an operation to be executed.

Specifically, when the action information indicates an "other action" that is not any of the "pinch-out with pointing by the pointer" and "pinch-in with pointing by the pointer" (step S201: No), the operation determining unit 240 determines an operation according to the judgment about the action and performs a corresponding process (step S900).

On the other hand, when the action information indicates any of the "pinch-out with pointing by the pointer" and the "pinch-in with pointing by the pointer" (step S201: Yes), the operation determining unit 240 determines whether or not the action information indicates the "pinch-out with pointing by the pointer" (step S202).

If the action information indicates the "pinch-out with pointing by the pointer" (step S202: Yes), the operation determining unit 240 starts a forward automatic page-turning process in order to turn the pages automatically in the forward direction (step S300).

Figure 11:
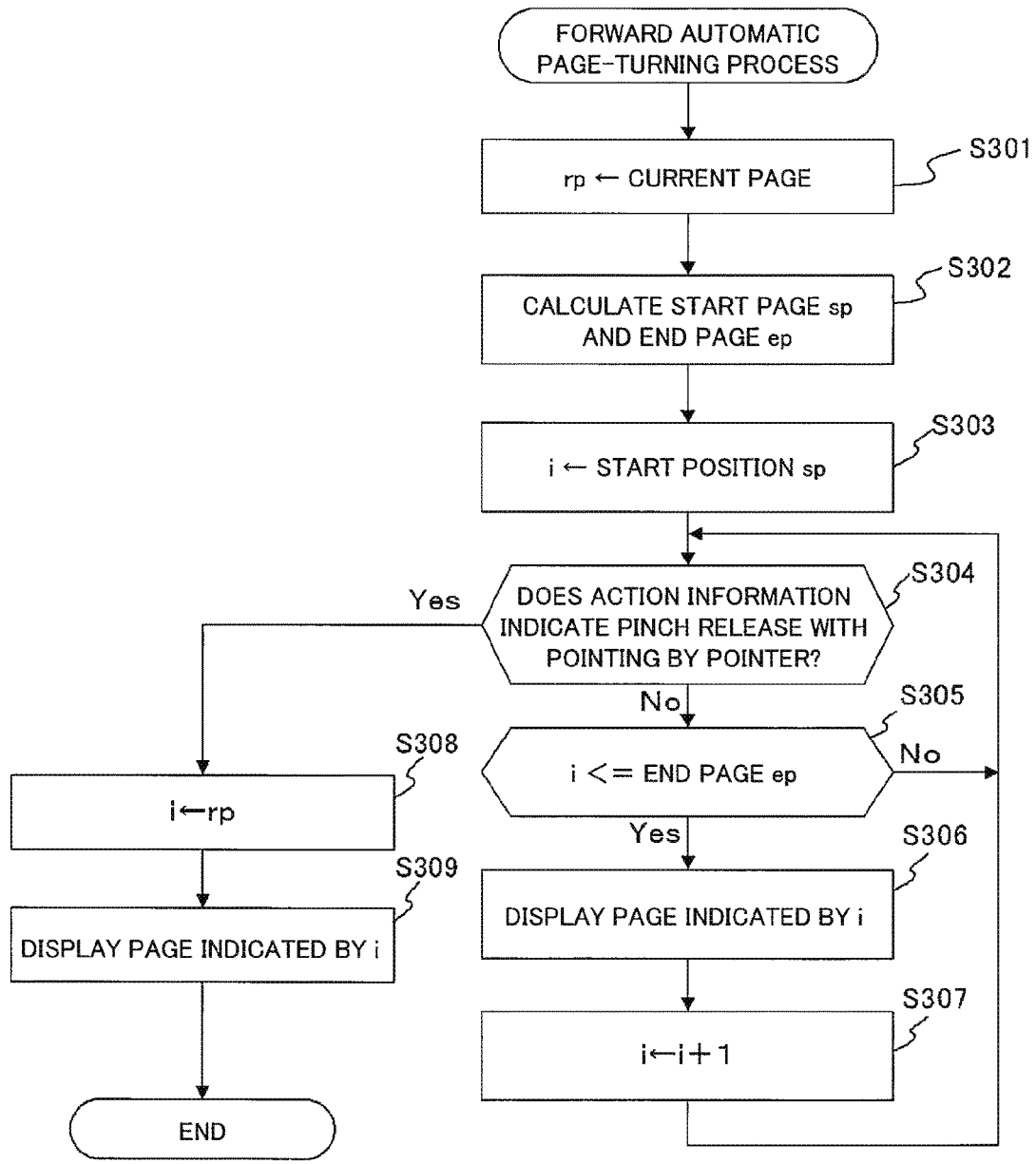
FIG. 11 is a flowchart illustrating a forward automatic page-turning process according to the first exemplary embodiment.

Details of the forward automatic page-turning process will be described with reference to FIG. 11.

First, the operation determining unit 240 stores the number of page currently being displayed as the return position rp after the forward automatic page-turning process has been completed to the storage unit 250 (step S301).

On the basis of the result of the action judging process, contact point information about a base point and a moving point, and the total number of pages of the electronic document stored in the storage unit 250, the operation determining unit 240 obtains the automatic page-turning start page $sp=T/L*L2$ and the end page $ep=T/L*L3$, and stores the start page sp and the end page ep to the storage unit 250 (step S302). Here, T is the total number of pages of the document to be displayed, L is the length of the scrollbar 125, L2 is the distance between position P2 and the right end of the scrollbar 125, and L3 is the distance between position P3 and the right end of the scrollbar 125.

The operation determining unit 240 sets the start position sp calculated at step S302 to an index i indicating a display page, and stores the index i to the storage unit 250 (step S303).

Then, the operation determining unit 240 determines whether or not the action judging unit 230 has judged the pinch release action on the basis of the action information stored in the storage unit 250 (step S304).

On the other hand, when the action information indicates an action other than a "pinch release action with pointing by the pointer" (step S304: No), the operation determining unit 240 determines whether or not the display page indicated by the index i exceeds the end page ep (step S305).

When the operation determining unit 240 determines that the display page indicated by the index i does not exceed the end page ep (step S305: Yes), the operation determining unit 240 determines to display the page indicated by the index i to the touch panel 220 (step S306). In response to this determination, the display control unit 210 displays the page indicted by the index i to the touch panel 220.

The operation determining unit 240 increments the index i (step S307). Then the process returns to step S304. The process described above is repeated until a pinch release action is detected.

In accordance with the process described above, the display control unit 210 displays the page of the document to the touch panel 220 while changing the page in the forward direction sequentially.

On the other hand, when it is determined that the index i exceeds the page number of the end page ep at step S305 (step S305: No), the operation determining unit 240 returns to step S304. The operation determining unit 240 continues to display the last page to the touch panel 220 by controlling the display control unit 210 until the pinch release action is detected.

On the other hand, when the action information stored in the storage unit 250 in the action judging process indicates a "pinch release action with pointing by the pointer" (step S304: Yes), the operation determining unit 240 stores a return position rp after the automatic page-turning process has been completed to the index i (step S308). The operation determining unit 240 determines to cause the touch panel 220 to display the page indicated by the index i, i.e. the page displayed before the start of the automatic page-turning process (step S309). In response to this determination, the display control unit 210 updates the display on the touch panel 220.

Through the sequence of the process described above, pages from the page corresponding to the position P2 illustrated in FIG. 6 to the page corresponding to the position P3 are displayed sequentially. If the right end of the scrollbar 125 corresponds to the beginning of the electronic document, the pages are displayed in sequence in the direction away from the beginning of the document toward the end of the document.

Then, the process returns to the operation determining process illustrated in FIG. 10. The current operation determining process is terminated.

The operation determining unit 240 repeats the operation determining process described above periodically, for example.

On the other hand, when the action information does not indicate a pinch-out (step S202: No), the operation determining unit 240 determines that a "pinch-in with pointing by the pointer" as illustrated in FIG. 7 has been detected, and starts a backward automatic page-turning process in order to turn pages automatically backward (step S400).

Figure 12:
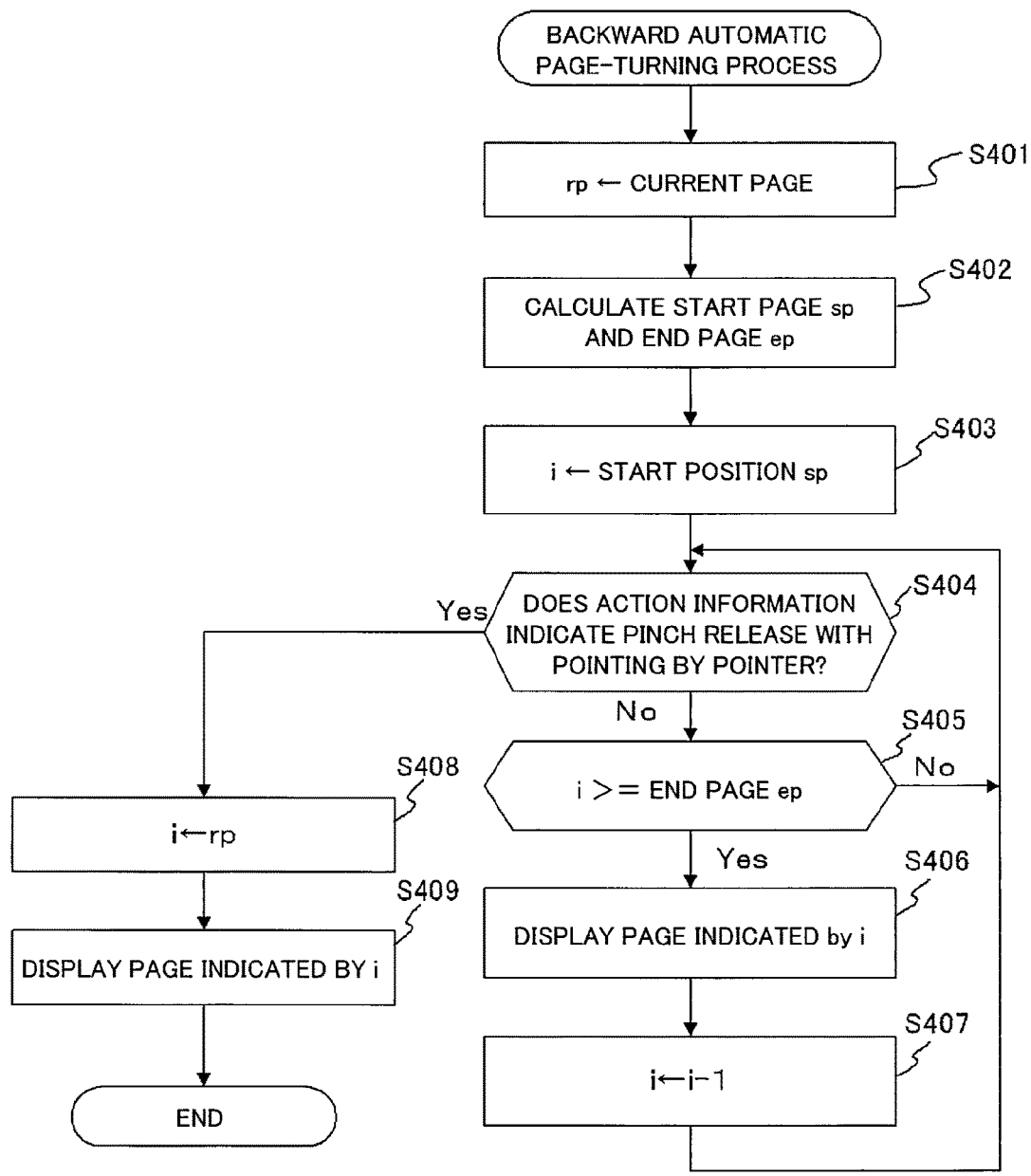
FIG. 12 is a flowchart illustrating a backward automatic page-turning process according to the first exemplary embodiment.

Details of the backward automatic page-turning process will be described with reference to FIG. 12.

First, the operation determining unit 240 stores the page number currently being displayed in the storage unit 250 as the return position rp after the backward automatic page-turning process has been completed (step S401).

On the basis of the result of the action judging process, contact point information about a base point and a moving point, and the total number of pages of the electronic document stored in the storage unit 250, the operation determining unit 240 obtains the start page sp=T/L*L2 and the end page ep=T/L*L4 of automatic page-turning, and stores the start page sp and the end page ep to the storage unit 250 (step S402). Here, T is the total number of pages of the document to be displayed, L is the length of the scrollbar 125, L2 is the distance between position P2 and the right end of the scrollbar 125, and L4 is the distance between position P4 and the right end of the scrollbar 125.

The operation determining unit 240 sets the start position sp calculated at step S402 to the index i indicating a display page, and stores the index i to the storage unit 250 (step S403).

Then, the operation determining unit 240 determines whether or not the action judging unit 230 has judged the pinch release action on the basis of the action information stored in the storage unit 250 (step S404).

On the other hand, when the action information indicates an action other than a "pinch release action with pointing by the pointer" (step S404: No), the operation determining unit 240 determines whether or not the display page indicated by the index i is below the end page ep (step S405).

When the operation determining unit 240 determines that the display page indicated by the index i is not below the end page ep (step S405: Yes), the operation determining unit 240 determines to display the page indicated by the index i to the touch panel 220 (step S406). In response to this determination, the display control unit 210 updates the display on the touch panel.

The operation determining unit 240 decrements the index i (step S407). Then, the process returns to step S404. The process described above is repeated until a pinch release action is detected.

In accordance with the process described above, the display control unit 210 displays the page of the document while changing the page in the backward direction sequentially.

On the other hand, when it is determined that the index i exceeds the page number of the end page ep at step S405 (step S405: No), the operation determining unit 240 returns to step S404. The operation determining unit 240 continues to display the last page to the touch panel 220 by controlling the display control unit 210 until the pinch release action is detected.

On the other hand, when the action information stored in the storage unit 250 in the action judging process indicates a "pinch release action with pointing by the pointer" at step S404 (step S404: Yes), the operation determining unit 240 stores a return position rp after the automatic page-turning process has been completed to the index i (step S408). The operation determining unit 240 causes the display control unit 210 to display the page indicated by the index i, i.e. the page displayed before the start of the automatic page-turning process (step S409).

Through the sequence of the process described above, pages from the page corresponding to the position P2 illustrated in FIG. 7 to the page corresponding to the position P4 are displayed sequentially. If the right end of the scrollbar 125 depicted in FIG. 7 corresponds to the beginning of the electronic document, the pages are displayed in sequence in the direction away from the end of the document toward the beginning of the document.

Then, the process returns to the operation determining process illustrated in FIG. 10. The current operation determining process is terminated.

The operation determining unit 240 repeats the operation determining process described above periodically, for example.

As has been described above, according to this exemplary embodiment, the user can perform the automatic page-turning by performing the pinch-in action or the pinch-out action touching the touch panel 120 with two fingers and sliding only one of the fingers on the touch panel 120. Furthermore, the user can intuitively adjust the start position and the end position of the automatic page-turning by the degree of spread of fingers and the amount of sliding of fingers. The pinch-in action and the pinch-out action can be performed with one hand and are easy to perform. Thus, the start and end positions and the direction of the automatic page-turning can be specified by intuitive actions that resemble turning pages of the usual printed book.

Moreover, an original page can be redisplayed simply by taking off a slid finger from the touch panel 120 without using a bookmark or the like. Accordingly, the user can readily return to the original page after reading a previous or subsequent page.

Second Exemplary Embodiment

Desired speed of automatic page-turning varies depending on preferences of individual users and scenes. It is therefore desirable that the speed of automatic page-turning can readily be adjusted by users.

An electronic document reader 200 that allows the speed of automatic page-turning to be easily adjusted will be described below.

Like the electronic document reader 100 of the first exemplary embodiment, the electronic document reader 200 according to a second exemplary embodiment starts or stops automatic page-turning when the electronic document reader 200 detects a pinch-in action, a pinch-out action or a pinch release action.

Figure 3:
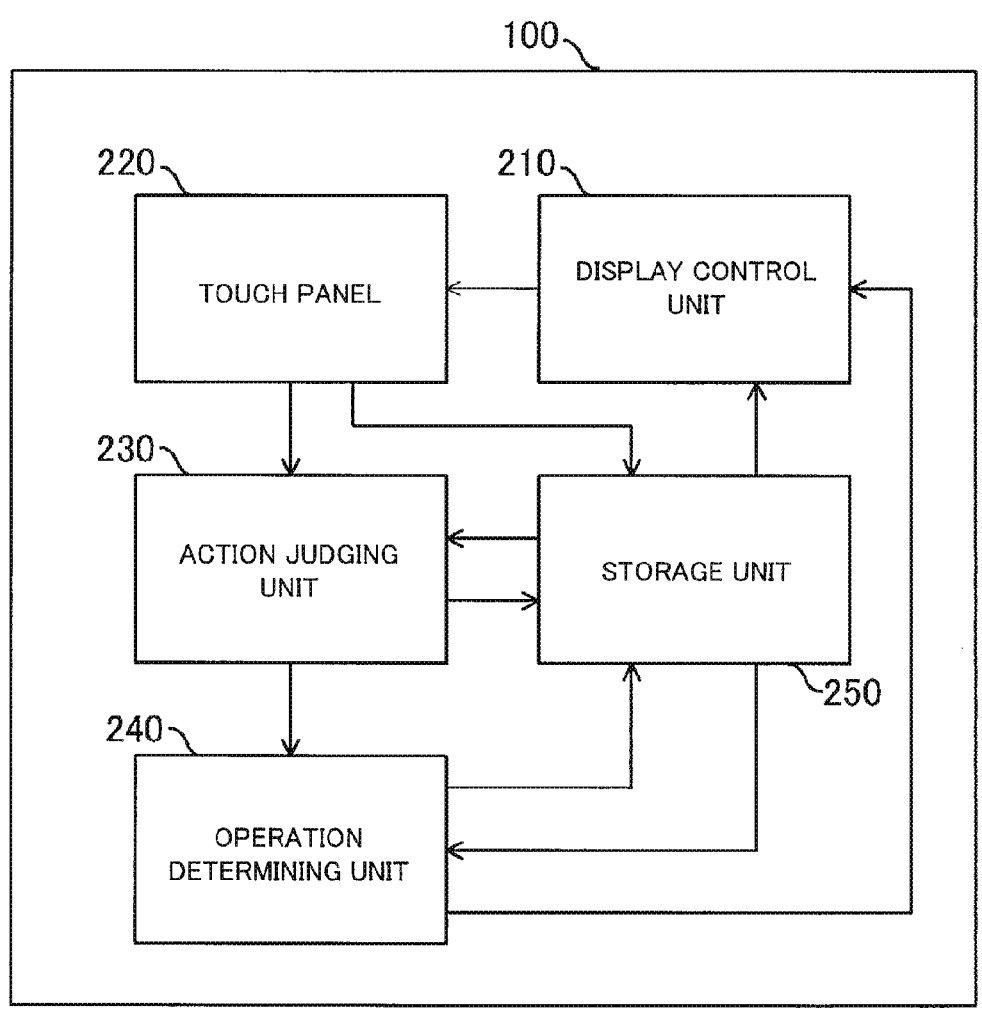
FIG. 3 is a block diagram illustrating a functional configuration of the electronic document reader according to the first exemplary embodiment.

Like the electronic document reader 100 according to the first exemplary embodiment, the electronic document reader 200 includes the hardware configuration illustrated in FIG. 1 and the functional configuration illustrated in FIG. 3.

The electronic document reader 200 stores an "automatic page-turning speed", which is a set speed of automatic page-turning, in a storage unit 250. The electronic document reader 200 changes display of the pages based on time intervals set as the "automatic page-turning speed".

At the start of automatic page-turning, an operation determining unit 240 refers to a default speed determination table 251, which will be described later, to determine the speed at which pages are turned and records the speed in the storage unit 250 as the "automatic page-turning speed".

Figures 13, 14:
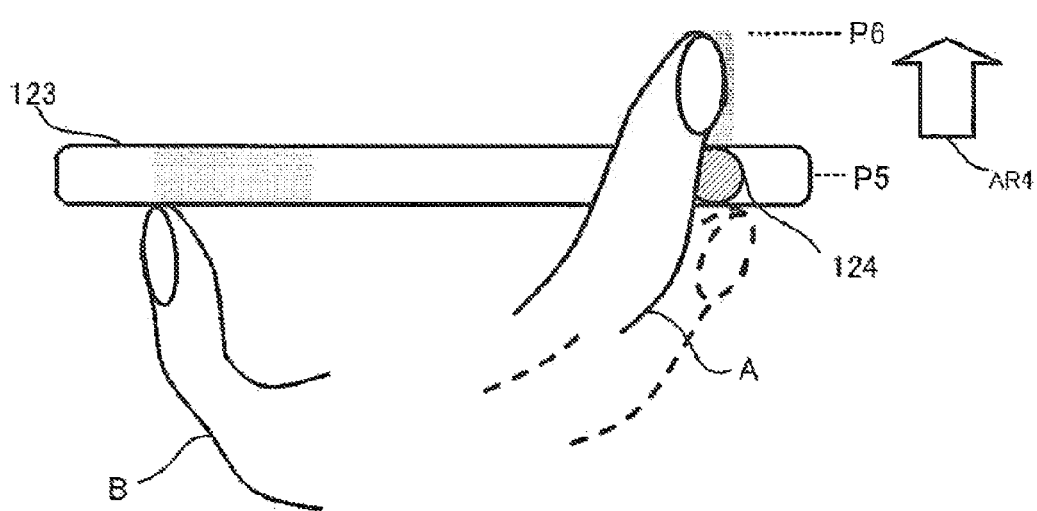
FIG. 13 is a diagram illustrating an example of data in a default speed determination table according to a second exemplary embodiment.
FIG. 14 is a diagram illustrating an action for commanding to update the speed of automatic page-turning according to the second exemplary embodiment.

The default speed determination table 251 is stored in the storage unit 250 and stores information in which the "total number of pages" indicating the number of pages of an entire document to be displayed is associated with "page-turning intervals" indicating the time intervals at which pages are turned as illustrated in FIG. 13. For example, if the number of pages of an entire electronic document is 250, the associated "page-turning intervals" is 2 seconds. Accordingly, the operation determining unit 240 determines the "automatic page-turning speed" to be 2 seconds. In other words, automatic page-turning is executed at intervals of 2 seconds.

Furthermore, during automatic page-turning, the operation determining unit 240 changes the set speed of automatic page-turning in accordance with a "page-turning speed change action" performed by the user to command to change the speed of page-turning.

As the "page-turning speed change action", the user performs the following actions.

To increase the speed of page-turning, the user touching the scrollbar 125 with fingers A and B as illustrated in FIG. 14 slides finger A from the position of the pointer 126 upward in the direction vertical to the scrollbar 125 (the direction indicated by arrow AR4).

Figures 15, 16:
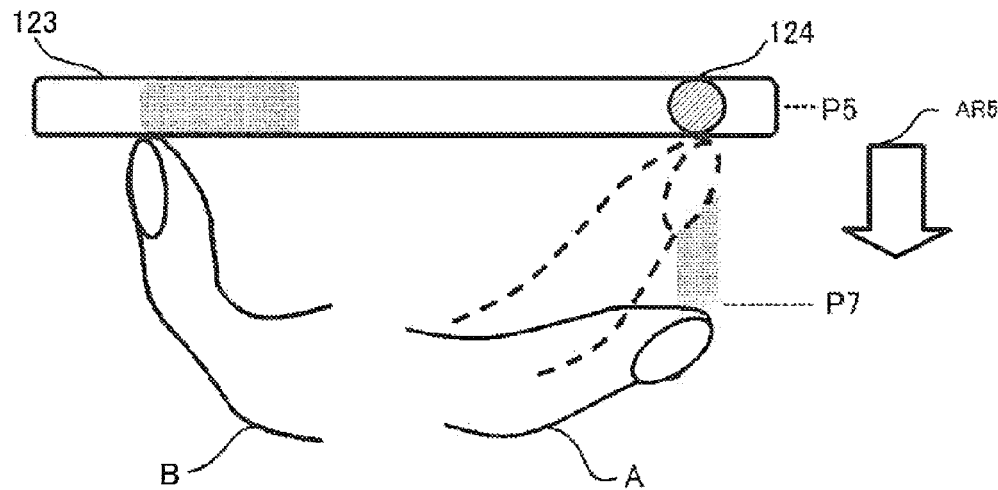
FIG. 15 is a diagram illustrating an action for commanding to update the speed of automatic page-turning according to the second exemplary embodiment.
FIG. 16 is a diagram illustrating an example of data in a speed change amount determination table according to the second exemplary embodiment.

On the other hand, to decrease the speed of page-turning, the user touching the scrollbar 125 with fingers A and B as illustrated in FIG. 15 slides finger A from the position of the pointer 126 downward in the direction vertical to the scrollbar 125 (the direction indicated by arrow AR5).

When the action judging unit 230 detects any of the user actions described above, the operation determining unit 240 determines the speed of automatic page-turning as follows.

First, the operation determining unit 240 obtains the direction of movement of a contact point on the pointer 126 and the distance of the movement from the pointer 126 based on contact point information acquired by the touch panel 220. The operation determining unit 240 then refers to a speed change amount determination table 252 in order to acquire the amount of speed change indicated by the direction and distance of movement of the contact point.

As illustrated in FIG. 16, the speed change amount determination table 252 stores "direction" indicating the direction of movement of a contact point on the pointer 126 and "movement distance" indicating the distance of the movement of the contact point, and "speed change amount" which indicates an amount of change in speed of automatic page-turning and is associated with the movement direction and the movement distance. "Direction" can take a value "+" or "−", which indicates that the contact point on the pointer 126 has moved upward or downward, respectively, in the direction vertical to the scrollbar 125. "+" or "−" specifies that speed is to be increased or decreased, respectively.

In the speed change amount determination table 252, the speed change amount increases as the contact point moves further away from the pointer 126 upward in the direction vertical to the scrollbar 125. This means that the speed of automatic page-turning increases. On the other hand, the speed change amount that takes a negative value increases as the contact point moves further away from the pointer 126 downward in the direction vertical to the scrollbar 125. This means that the speed of automatic page-turning decreases.

The operation determining unit 240 obtains the "speed change amount" associated with the obtained movement direction and movement distance, adds the speed change amount to the default speed which has been set when starting the automatic page-turning and sets the calculated speed as a changed "automatic page-turning speed".

For example, assume that the "automatic page-turning speed" is set to "3 seconds". When the distance between P5 and P6 in FIG. 14 is 3 millimeters, the speed change amount determination table 252 shows that the "direction" is "+" (this is because the movement direction in the vertical direction is upward), the "movement distance" is 3 millimeters and the "amount of speed change" is "−0.3" (seconds). Accordingly, the new "automatic page-turning speed" is 3+(−0.3)=2.7 (seconds). In other words, the speed is changed so that pages are automatically turned at intervals of 2.7 seconds.

An operation of the electronic document reader 200 having the configuration described above will be described next.

The following description will focus on a page-turning speed update process on the electronic document reader 200 that is characteristic of this exemplary embodiment.

When the user specifies start and end pages of automatic page-turning by performing a pinch-out action while a given page of a given document is displayed, the action judging unit 230 judges what kind of action has been performed by the user based on contact point information stored in the storage unit 250, and the operation determining unit 240 determines to automatically turn pages from the specified start page.

In response to this determination, the display control unit 210 starts the operation of changing display from one page of the document to another in sequence starting at the specified start page.

Assume that the user then has performed the page-turning speed update action described above to command to update the page-turning speed.

The touch panel 220 detects contact points in a display range (hereinafter referred to as the command detection region) in the input interface display region 124 every unit time and stores the coordinates of the positions at which contact points have been detected and the times of acquisition of the coordinates in the storage unit 250 in sequence.

Figure 17:
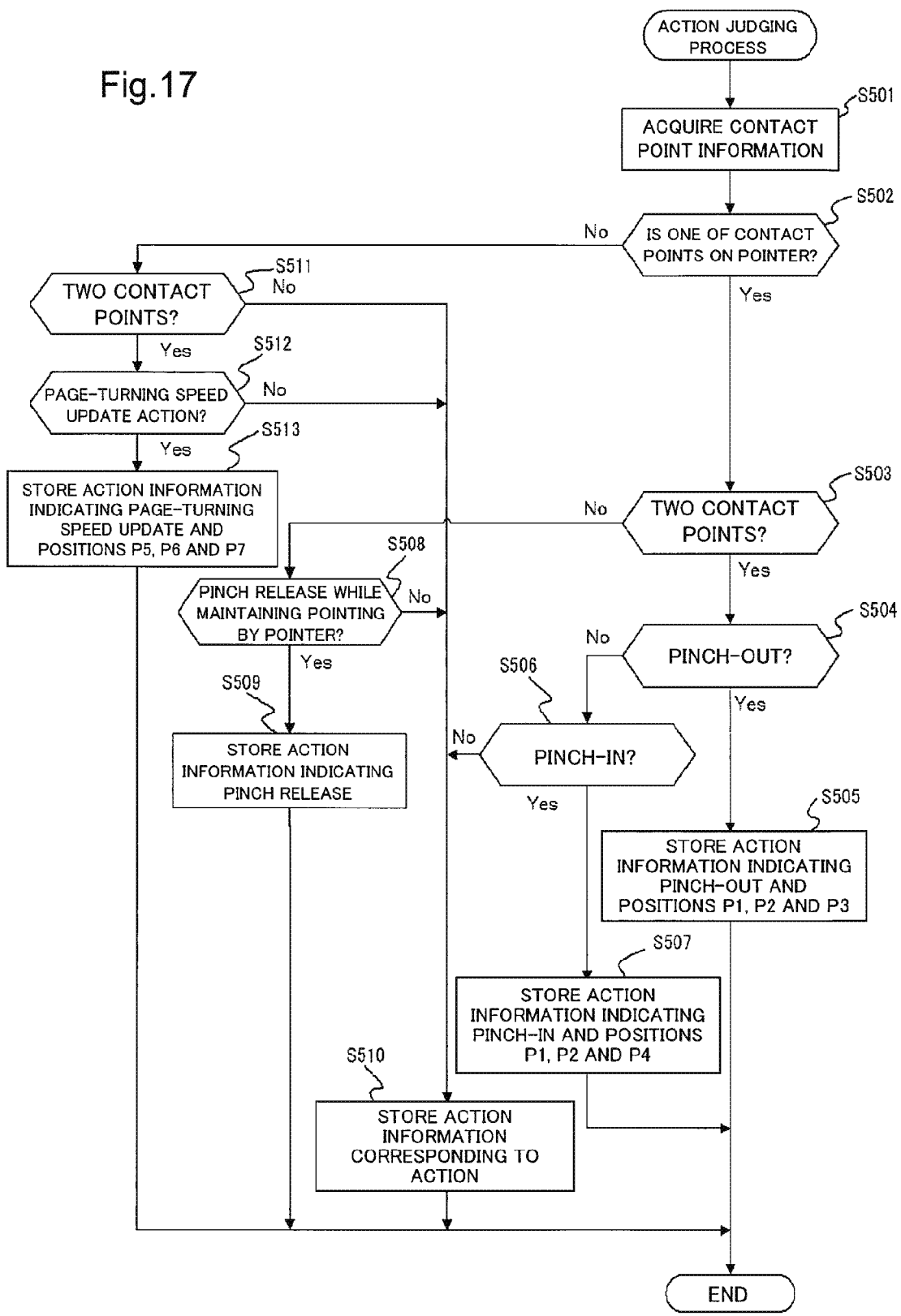
FIG. 17 is a flowchart illustrating an action judging process according to the second exemplary embodiment.

On the other hand, the action judging unit 230 repeatedly performs an action judging process illustrated in FIG. 17.

First, the action judging unit 230 acquires contact point information in the command detection region that is stored in the storage unit 250 (step S501).

On the basis of the contact point information, the action judging unit 230 judges whether or not one of the contact points is on the pointer 126 (step S502).

When the action judging unit 230 judges that one of the contact points is on the pointer 126 (step S502: Yes), the action judging unit 230 judges whether or not the number of contact points on the scrollbar 125 is two based on the acquired contact point information (step S503).

When the action judging unit 230 judges at step S503 that the number of contact points on the scrollbar 125 is two (step S503: Yes), the action judging unit 230 judges whether or not the action is a pinch-out action (step S504). When the action judging unit 230 judges that the action is a pinch-out action (step S504: Yes), the action judging unit 230 stores action information indicating that the action is a "pinch-out with pointing by the pointer" and positions P1, P2 and P3 in the storage unit 250 (step S505).

When the action judging unit 230 judges at step S504 that the action is not a pinch-out action (step S504: No), the action judging unit 230 then judges whether or not the action is a pinch-in action (step S506). When the action judging unit 230 judges that the action is a pinch-in action (step S506: Yes), the action judging unit 230 stores action information indicating that the action is a "pinch-in with pointing by the pointer" and positions P1, P2 and P4 in the storage unit 250 (step S507).

When the action judging unit 230 judges at step S506 that the action is not a pinch-in action (step S506: No), the action judging unit 230 stores action information corresponding to the action in the storage unit 250 (step S510).

On the other hand, when the action judging unit 230 judges at step S503 that the number of contact points on the scrollbar 125 is not two (step S503: No), the action judging unit 230 judges whether or not the action is a pinch release action (step S508). When the action judging unit 230 judges that the action is a pinch release action (step S508: Yes), the action judging unit 230 stores action information indicating that the action is a "pinch release action with pointing by the pointer" in the storage unit 250 (step S509).

When the action judging unit 230 judges that the action is not a pinch release action (step S508: No), the action judging unit 230 stores action information corresponding to the action in the storage unit 250 (step S510).

On the other hand, when the action judging unit 230 judges at step S502 that there is not a contact point on the pointer 126 (step S502: No), the action judging unit 230 judges whether or not the number of contact points on the scrollbar 125 is two (step S511).

If the action judging unit 230 judges that the number of contact points on the scrollbar 125 is two (step S511: Yes), the action judging unit 230 judges whether or not the action is a page-turning speed update action (step S512).

Specifically, the action judging unit 230 judges whether or not the action is a page-turning speed update action as follows. When the action judging unit 230 detects that the contact point has moved from the pointer 126 in the direction vertical to the scrollbar 125 and then stopped, the action judging unit 230 determines that the action is a page-turning speed update action.

When the action judging unit 230 judges that the action is a page-turning speed change action (step S512: Yes), the action judging unit 230 stores action information indicating that the "page-turning speed change action" and positions P5, P6 and P7 in the storage unit 250 (step S513).

On the other hand, when the action judging unit 230 judges that the number of contact points on the scrollbar 125 is not two (step S511: No), the action judging unit 230 stores action information corresponding to the judgment about the action in the storage unit 250 (step S510).

When the action judging unit 230 judges that the action is not a page-turning speed update action (step S512: No), the action judging unit 230 stores action information corresponding to the judgment about the action in the storage unit 250 (step S510).

The action judging unit 230 repeats the process described above periodically, for example.

Figure 18:
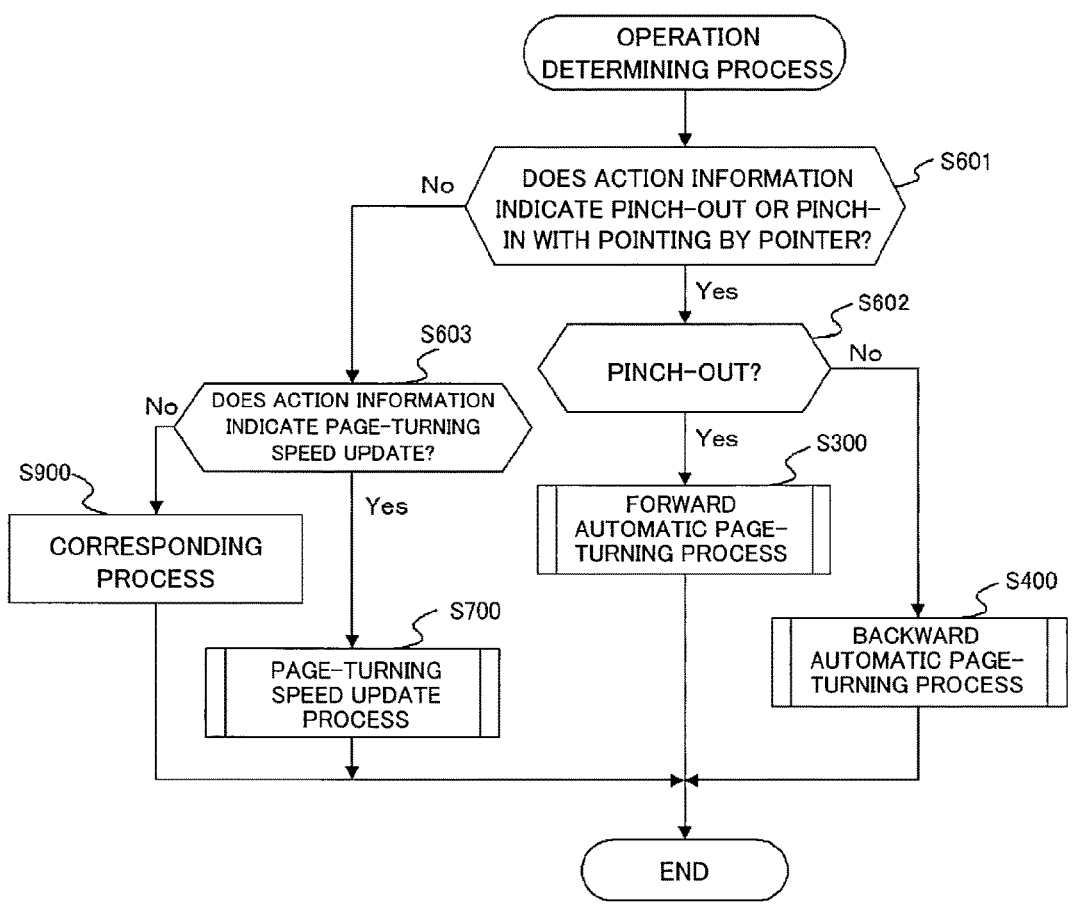
FIG. 18 is a flowchart illustrating an operation determining process according to the second exemplary embodiment.

When the action judging unit 230 stores action information in the storage unit 250 in the action judging process described above, the operation determining unit 230 starts an operation determining process illustrated in FIG. 18. In the operation determining process, the operation determining unit 240 determines, on the basis of the action information stored in the action judging process executed by the action judging unit 230, what kind of command has been input and determines an operation to be executed.

Specifically, the operation determining unit 240 determines whether or not the action information indicates any of a "pinch-out with pointing by the pointer" and a "pinch-in with pointing by the pointer" (step S601). When the action information indicates any of these actions (step S601: Yes), the operation determining unit 240 determines whether or not the action information indicates the "pinch-out with pointing by the pointer" (step S602).

When the action information indicates the "pinch-out with pointing by the pointer" (step S602: Yes), the operation determining unit 240 starts a forward automatic page-turning process for automatically turning pages forward (step S300). The forward automatic page-turning process is the same as that in the first exemplary embodiment.

When the action information does not indicate the "pinch-out with pointing by the pointer" (step S602: No), the operation determining unit 240 starts a backward automatic page-turning process for automatically turning pages backward (step S400). The backward automatic page-turning process is the same as that in the first exemplary embodiment.

On the other hand, when the action information indicates neither of the "pinch-out with pointing by the pointer" and the "pinch-in with pointing by the pointer" (step S601: No), the operation determining unit 240 determines whether or not the action information indicates the "page-turning speed change action" (step S603).

When the action information does not indicate the "page-turning speed change action" (Step S603: No), the operation determining unit 240 determines an operation according to the judgment about the action and performs a corresponding process (step S900).

Figure 19:
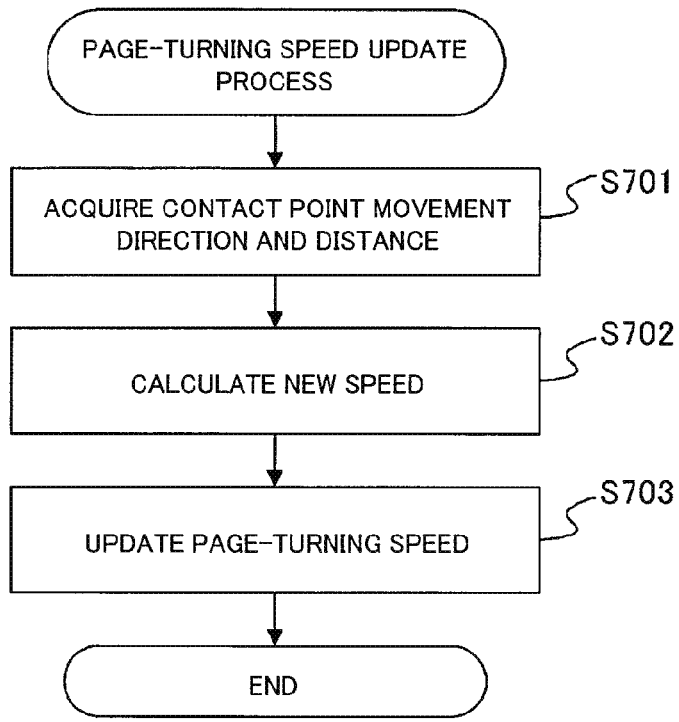
FIG. 19 is a flowchart illustrating a page-turning speed update process according to the second exemplary embodiment.

On the other hand, when the action information indicates the "page-turning speed change action" (step S603: Yes), the operation determining unit 240 starts a page-turning speed update process illustrated in FIG. 19 (step S700).

The operation determining unit 240 obtains the direction and distance of the movement of a base point on the basis of the contact point information of the base point acquired by the touch panel 220 (step S701).

On the basis of the direction and distance of movement of the base point and the speed change amount determination table 252, the operation determining unit 240 calculates a new "automatic page-turning speed" (step S702) and updates the "automatic page-turning speed" in the storage unit 250 (step S703).

After going through the process, the operation determining unit 240 ends the page-turning speed update process. The operation determining unit 240 then ends the operation determining process.

Through the sequence of the process described above, the speed of page-turning is updated in accordance with the command from the user during automatic page-turning and the automatic page-turning process is continued at the updated speed.

The operation determining unit 240 repeats the operation determining process described above periodically, for example.

As has been described above, the user can change the speed of automatic page-turning simply by sliding one finger used for a pinch-in action or a pinch-out action. The user thus can change the speed of page-turning by a simple action without interrupting the automatic page-turning.

While exemplary embodiments of the present invention have been described, the present invention is not limited by the exemplary embodiments.

While the electronic document reader 100 is taken as an example of an electronic apparatus according to the present invention in the exemplary embodiments described above, the present invention is also applicable to mobile phones, smartphones, game machines, tablet PCs (Personal Computers), laptop PCs, PDAs (Personal Digital Assistants) and the like that include a touch panel having multi-touch input functionality as a display unit.

While the exemplary embodiments have been described by taking an external touch panel 120 made up of the contact position detecting unit 121 and the display unit 122 stacked on top one another as an example, an electronic apparatus according to the present invention may include an in-cell or on-cell touch panel which is a liquid-crystal panel into which touch sensors are incorporated.

While the touch panel 120 includes the function of detecting contact of fingers or the like, the present invention is also applicable to a touch panel that detects not only contact but also approach to the touch panel.

While the distance over which a contact point has moved is acquired from acquired contact point information and the start and end pages of automatic page-turning are calculated on the basis of the contact-point movement distance and the total number of pages which is the total amount of a document to be displayed, a predetermined number of pages such as 10 pages, starting at a start page, for example, may be turned regardless of the contact-point movement distance.

While the electronic document reader 100 according to the exemplary embodiment described above includes a scrollbar 125 and a pointer 126 as an input interface, the input interface may take other form since the input interface needs only to include the function of displaying the position of the currently displayed page relative to the entire document and the function of scrolling (moving) pages by a contact action. For example, the interface may be a vertical slidable scrollbar.

While the automatic page-turning process and other processes are performed when two contact points are detected in the exemplary embodiments described above, a certain rule may be established for situations where three or more contact points are detected and determination as to whether to perform automatic page-turning may be made according to the rule. For example, when three contact points are detected and it is determined that two of the contact points are moving in the same direction at the same speed, then the action may be judged to be a predetermined action for automatic page-turning and automatic page-turning may be started.

While the default speed for automatic page-turning is determined on the basis of the total number of pages of a document to be displayed in the exemplary embodiments described above, other methods than the method described above may be used.

For example, a predetermined page-turning speed may be set as the default speed regardless of the total number of pages of a document to be displayed. Alternatively, the speed of movement of a contact point in a pinch-in or pinch-out action that commands to perform automatic page-turning may be obtained and a speed proportional to the speed of movement of the contact point may be set as the default speed for automatic page-turning.

The method for updating the page-turning speed is not limited to the method using the information described above and other method may be used. For example, the speed of movement of a contact point that has moved in the direction vertical to the scrollbar may be obtained on the basis of acquired contact point information and a speed proportional to the speed of movement of the contact point may be set as a new speed for page-turning.

Alternatively, the electronic document reader 100 may further be provided with an accelerometer capable of detecting gravity or acceleration and the speed of page-turning may be changed on the basis of a change in the direction of the gravity or presence or absence of vibration. In this case, when the user wants to increase the speed of page-turning, for example, the user tilts the electronic document reader 100 to the right; when the user wants to decrease the speed, the user tilts the electronic document reader 100 to the left. Furthermore, the degree of increase or decrease of speed is set proportionally to the degree of tilt.

When the user tilts the electronic document reader 100 to the right or left, the accelerometer detects the direction and degree of the tilt of the electronic document reader. When the accelerometer detects tilt, the action judging unit 230 judges that a "page-turning speed change action" has been performed and changes the speed of automatic page-turning in accordance with the direction and degree of the tilt. More specifically, when the accelerometer detects tilt to the left, the action judging unit 230 judges that an action for increasing the page-turning speed has been performed and increases the page-turning speed in proportion to the degree of the tilt.

When the accelerometer detects tilt to the right, the action judging unit 230 judges that an action for decreasing the page-turning speed has been performed and decreases the page-turning speed in proportion to the degree of the tilt.

In the exemplary embodiments described above, automatic page-turning is performed at constant time intervals. However, for example, greater time intervals may be set for automatic page-turning in a predetermined time period immediately after the start of the automatic page-turning and in a predetermined time period immediately before the end of the automatic page-turning than a time interval or time intervals in the rest of the page-turning duration. For that purpose, a plurality of pieces of information about the time intervals at which pages are turned may be stored in the storage unit 250.

While examples have been described in which pages of a document to be displayed are turned from left to right in the exemplary embodiments described above, a document to be displayed is not limited to this; a document to be displayed may be a document whose pages are turned from right to left or a document whose pages are turned from bottom to top or from top to bottom.

Since pages of the document to be displayed in the examples described above are turned from left to right, pages are turned forward, i.e. in the direction from the first toward the last page of the document to be displayed when a pinch-out action as illustrated in FIG. 5 is performed to command to automatically turn pages. However, in the case of a document to be displayed whose pages are turned right to left, the same action turns pages in the direction from the first toward the last page of the document to be displayed. When a pinch-in action as illustrated in FIG. 6 is performed for a document whose pages are turned from left to right to command to automatically turn pages, pages are turned backward, i.e. in the direction from the last toward the first page of the document to be displayed. The same action turns pages of a document to be displayed whose pages are turned from right to left in the direction from the first toward the last page of the document to be displayed.

Furthermore, when an electronic document whose pages are turned from bottom to top or from top to bottom is displayed, the electronic document reader may display a vertical scrollbar. Again, a pinch-in or pinch-out action on the scrollbar may determine the direction in which pages are turned as described above.

Furthermore, the touch panel 220 in the exemplary embodiment described above outputs the coordinates of acquired contact points and their acquisition times. The action judging unit 230 judges movement and the like of a contact point based on a series of pieces of contact point information and their acquisition times. However, acquisition times themselves are not essential; any other information that indicates a history can be used instead. For example, the action judging unit 230 may judge movement and the like of a contact point based on the coordinate of the acquired contact point and any information that indicates a history of the contact point such as the number of the time frame in which the coordinate of the contact point have been acquired.

While the above-described exemplary embodiment mentions that pinch-out and pinch-in actions in which finger A is kept at rest and finger B is slid as illustrated in FIGS. 5 to 7 are performed, any of fingers A and B may be slid in pinch-in and pinch-out actions. This is because the hand used for performing the actions may vary depending on which of the user's hands is dominant.

Figure 20:
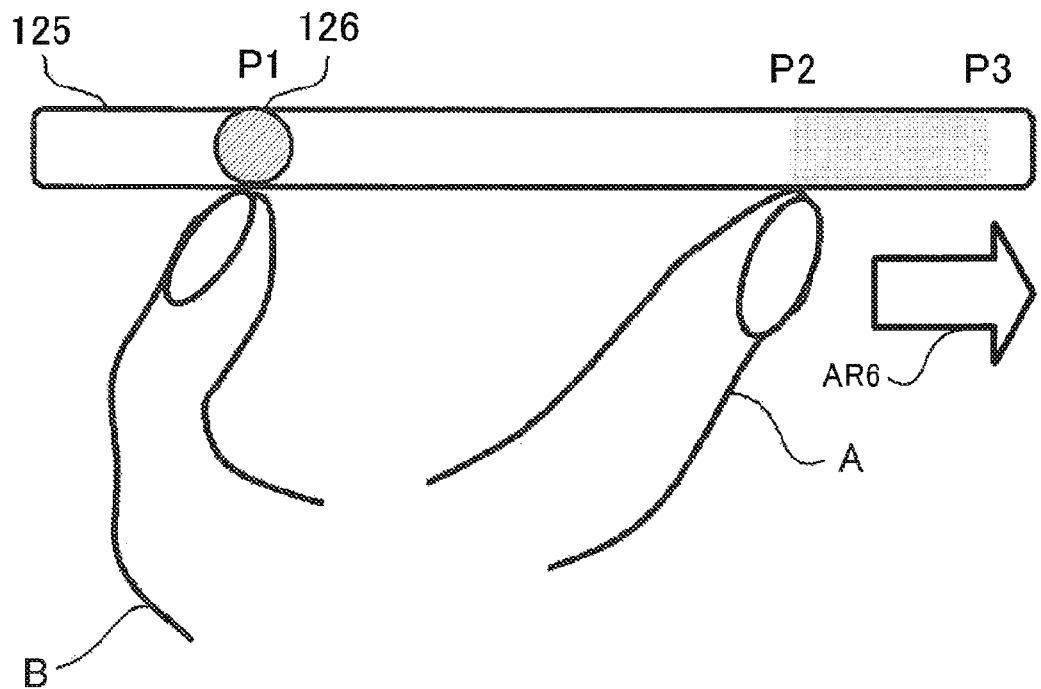
FIG. 20 is a diagram illustrating an example of a pinch-out action different from the one illustrated in FIG. 6.

For example, as illustrated in FIG. 20, a user may perform a pinch-out action in which the user touches the pointer 126 with finger B and slides finger A in the direction indicated by arrow AR6 to command to perform automatic page-turning. In this case, the automatic page-turning starts at the page corresponding to position P2 and ends at the page corresponding to position P3. For example, in the case of a document to be displayed whose pages are turned from left to right, pages are turned backward.

Figure 21:
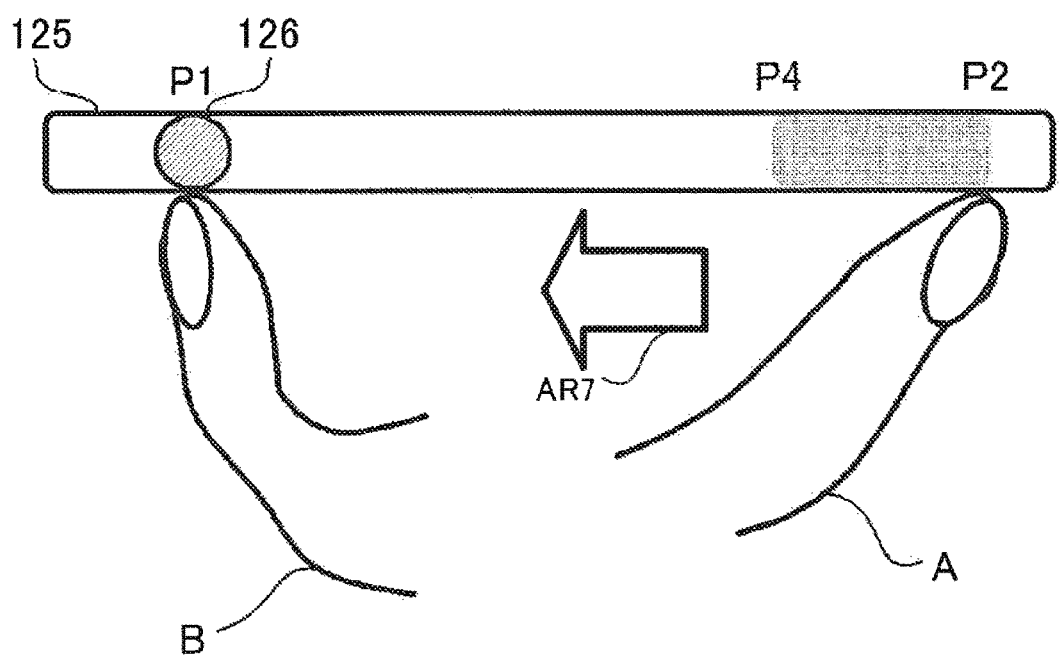
FIG. 21 is a diagram illustrating an example of a pinch-in action different from the one illustrated in FIG. 7.

Moreover, as illustrated in FIG. 21, a user may perform a pinch-in action in which the user touches the pointer 126 with finger B and slides finger A in the direction indicated by arrow AR7 to command to perform automatic page-turning. In this case, the automatic page-turning starts at the page corresponding to position P2 and ends at the page corresponding to position P4. In the case of a document to be displayed whose pages are turned from left to right, pages are turned forward.

In the exemplary embodiments described above, the action of taking off a finger that is not in contact with the pointer 126 is judged as the pinch release action. However, the action of taking off a finger that is in contact with the pointer 126 may be judged as the pinch release action. Furthermore, the action of taking off both fingers in contact with the scrollbar 125 may be judged as the pinch release action. Alternatively, all of these actions may be judged as the pinch release action.

Electronic apparatus according to the present invention are not limited to dedicated systems and can be implemented by usual computer systems. For example, a program for executing the operations described above may be stored on a computer-readable storage medium such as a flexible disk, CD-ROM (Compact Disk-Read Only Memory), DVD (Digital Versatile Disk), MO (Magnet Optical Disk) or the like and distributed to a computer connected to a network and the program may be installed in the computer system to configure an electronic apparatus that executes the processes described above.

Furthermore, any method may be used for providing the program to a computer. For example, the program may be uploaded on a bulletin board system (BBS) on a communication network and delivered to a computer through the communication network. The program may be transferred by a modulated wave that is a carrier wave modulated by a signal representing the program and an apparatus that has received the modulated wave may demodulate the modulated wave to restore the program. The computer activates the program and executes the program under the control of an OS in a way similar to the way other applications are executed. This causes the computer to function as an electronic apparatus that executes the processes described above.

Various exemplary embodiments and variations of the present invention can be made without departing from the broad spirit and scope of the present invention. The exemplary embodiments described above are illustrative of the present invention and are not intended to limit the scope of the present invention. In other words, the scope of the present invention is not defined by the exemplary embodiments but is defined by the claims. Various variations made within the scope of the claims and the scope of the meanings of the present invention that are equivalent to the claims are construed as falling within the scope of the present invention.

The whole or part of the exemplary embodiments disclosed above can be described as, but not limited to, the following supplementary notes.

(Supplementary Note 1) An electronic apparatus including:

a touch panel which includes a display function and a position input function of acquiring position information indicating the position of contact with or approach to an operation surface in every period divided by predetermined intervals;

a storage unit which stores the position information acquired by the position input function and information indicating a history of the position information;

a display control unit which controls the touch panel so as to display a document to be displayed;

an action judging unit which judges whether or not an action by the contact with or the approach to the operation surface of the touch panel is a first predetermined action that changes a distance between the plurality of points on the basis of position information indicating each of the plurality of points and information indicating the history of the position information when the position input function acquires position information indicating a plurality of points including contact with or approach to a predetermined position; and an operation determining unit which obtains the position of one of the plurality of points before a change in the distance between the plurality of points on the basis of position information and information indicating the history of the position information stored in the storage unit when the action judging unit judges that the action by the contact with or the approach to the operation surface of the touch panel is the first predetermined action, and determines a start page of automatic page-turning changing display pages of the document to be displayed from one page to another in sequence on the basis of the amount of the entire document to be displayed and the obtained position of the one point;

wherein when the action judging unit judges that the action by the contact with or approach to the operation surface of the touch panel is the first predetermined action, the display control unit controls the touch panel so as to display the document to be displayed in sequence starting at the start page of automatic page-turning determined by the operation determining unit.

(Supplementary Note 2) The electronic apparatus according to Supplementary Note 1, wherein when the action judging unit determines that the action by the contact with or approach to the operation surface of the touch panel is the first predetermined action, the operation determining unit obtains the position of one of the plurality of points after a change in the distance between the plurality of points from position information stored in the storage unit and determines an end page of automatic page-turning changing display pages of the document to be displayed from one page to another in sequence on the basis of the amount of the entire document to be displayed and the obtained position of the one point; and when the action judging unit judges that the action by the contact with or approach to the operation surface of the touch panel is the first predetermined action, the display control unit controls the touch panel so as to display the document to be displayed to the automatic page-turning end page determined by the operation determining unit.

(Supplementary Note 3) The electronic apparatus according to Supplementary Note 1 or 2, wherein the action judging unit further judges whether the action by the contact with or approach to the operation surface of the touch panel has changed from the first predetermined action to a second predetermined action;

when the action judging unit judges that the action by the contact with or approach has changed from the first predetermined action to the second predetermined action, the operation determining unit determines to redisplay a page displayed before the start of the automatic page-turning; and the display control unit controls the touch panel so as to display the page determined by the operation determining unit.

(Supplementary Note 4) The electronic apparatus according to any one of Supplementary Notes 1 to 3, wherein the first predetermined action is an action in which the position of one of the plurality of points is fixed and the position of at least one of the other points is changed; and the one point is at least one of the plurality of points other than the fixed one point.

(Supplementary Note 5) The electronic apparatus according to any one of Supplementary Notes 1 to 4, wherein the touch panel displays a scrollbar and displays a pointer in a position representing a relative position of a currently displayed page of the document to be displayed on the scrollbar; and the predetermined position is the position of the pointer.

(Supplementary Note 6) The electronic apparatus according to any one of Supplementary Notes 1 to 5, wherein the action judging unit judges whether the distance between the plurality of points is greater than or smaller than the distance between the plurality of points before the change in the distance between the plurality of points; and the operation determining unit determines a direction of the page change in accordance with the result of the judgment by the action judging unit about whether the distance between the plurality of points is greater or smaller.

(Supplementary Note 7) The electronic apparatus according to any one of Supplementary Notes 1 to 6, wherein the action judging unit further judges whether or not the action by the contact or the approach is a particular action specifying speed of the automatic page-turning;

the operation determining unit further determines speed for the automatic page-turning on the basis of position information acquired by the touch panel when the action judging unit judges that the action by the contact or the approach is the particular action specifying the speed of the automatic page-turning; and the display control unit displays display pages of the document to be displayed from one page to another in sequence at the automatic page-turning speed determined by the operation determining unit.

(Supplementary Note 8) The electronic apparatus according to any one of Supplementary Notes 1 to 7, wherein the storage unit further stores page speed determination information in which position information indicating contact with or approach to the touch panel and speeds of automatic page-turning are associated with each other; and the operation determining unit determines the speed for the automatic page-turning on the basis of position information acquired by the touch panel and the page speed determination information.

(Supplementary Note 9) A document display method including:

an acquisition step of acquiring position information indicating the position of contact with or approach to an operation surface of a touch panel in every period divided by predetermined intervals;

a storage step of storing the position information acquired in the acquisition step and information indicating a history of the position information;

an action judging step of judging whether or not an action by the contact with or the approach to the operation surface of the touch panel is a first predetermined action that changes a distance between the plurality of points on the basis of position information indicating each of the plurality of points and information indicating the history of the position information when position information indicating a plurality of points including contact with or approach to a predetermined position is acquired in the acquisition step;

an operation determining step of obtaining the position of one of the plurality of points before a change in the distance between the plurality of points on the basis of position information and information indicating the history of the position information stored in the storage step when it is judged in the action judging step that the action by the contact with or the approach to the operation surface of the touch panel is the first predetermined action, and determining a start page of automatic page-turning changing display pages of the document to be displayed from one page to another in sequence on the basis of the amount of the entire document to be displayed and the obtained position of the one point; and when it is judged in the action judging step that the action by the contact with or approach to the operation surface of the touch panel is the first predetermined action, a step of causing the touch panel to display the display pages of the document to be displayed in sequence starting at the start page determined in the operation determining step.

(Supplementary Note 10) A computer-readable recording medium on which a program is recorded, the program causing a computer to implement:

a position input function of acquiring position information indicating the position of contact with or approach to an operation surface of a touch panel in every period divided by predetermined intervals;

a display function of displaying a document to be displayed on the touch panel;

a storage function of storing the position information acquired by the position input function and information indicating a history of the position information;

an action judging function of judging whether or not an action by the contact with or the approach to the operation surface of the touch panel is a first predetermined action that changes a distance between the plurality of points on the basis of position information indicating each of the plurality of points and information indicating the history of the position information when the position input function acquires position information indicating a plurality of points including contact with or approach to a predetermined position is acquired;

an operation determining function of obtaining the position of one of the plurality of points before a change in the distance between the plurality of points on the basis of position information and information indicating the history of the position information stored by the storage function when the action judging function judges that the action by the contact with or the approach to the operation surface of the touch panel is the first predetermined action, and determining a start page of automatic page-turning changing display pages of the document to be displayed from one page to another in sequence on the basis of the amount of the entire document to be displayed and the obtained position of the one point; and when the action judging function judges that the action by the contact with or approach to the operation surface of the touch panel is the first predetermined action, a function of causing the touch panel to display the display pages of the document to be displayed in sequence starting at the start page determined by the operation determining function.

This application is based upon and claims the benefit of priority from Japanese patent application No. 2012-183443, filed on Aug. 22, 2012, the disclosure of which is incorporated herein in its entirety by reference.

REFERENCE SIGNS LIST

100 . . . Electronic document reader
110 . . . Control unit
120 . . . Touch panel
121 . . . Contact position detecting unit
122 . . . Display unit
123 . . . Document display region
124 . . . Input interface display region
125 . . . Scrollbar
126 . . . Pointer
130 . . . Memory
140 . . . Communication unit
150 . . . Recording medium reading unit
200 . . . Electronic document reader
210 . . . Display control unit
220 . . . Touch panel
230 . . . Action judging unit
240 . . . Operation determining unit
250 . . . Storage unit
251 . . . Default speed determination table
252 . . . Speed change amount determination table
A, B . . . Finger
P1, P2, P3, P4, P5, P6, P7 . . . Position

What is claimed is:

1. An electronic apparatus comprising:
   a touch panel which includes a display function and a position input function of acquiring position information indicating the position of contact with or approach to an operation surface in every period divided by predetermined intervals;
   a storage unit which stores the position information acquired by the position input function and information indicating a history of the position information;
   a display control unit which controls the touch panel so as to display a document to be displayed;
   an action judging unit which judges whether or not an action by the contact with or the approach to the operation surface of the touch panel is a first predetermined action that changes a distance between the plurality of points on the basis of position information indicating each of the plurality of points and information indicating the history of the position information when the position input function acquires position information indicating a plurality of points including contact with or approach to a predetermined position; and
   an operation determining unit which obtains the position of one of the plurality of points before a change in the distance between the plurality of points on the basis of position information and information indicating the history of the position information stored in the storage unit when the action judging unit judges that the action by the contact with or the approach to the operation surface of the touch panel is the first predetermined action, and determines a start page of automatic page-turning changing display pages of the document to be displayed from one page to another in sequence on the basis of the amount of the entire document to be displayed and the obtained position of the one point;

wherein when the action judging unit judges that the action by the contact with or approach to the operation surface of the touch panel is the first predetermined action, the display control unit controls the touch panel so as to display the document to be displayed in sequence starting at the start page of automatic page-turning determined by the operation determining unit.

2. The electronic apparatus according to claim 1,
wherein when the action judging unit determines that the action by the contact with or approach to the operation surface of the touch panel is the first predetermined action, the operation determining unit obtains the position of one of the plurality of points after a change in the distance between the plurality of points from position information stored in the storage unit and determines an end page of automatic page-turning changing display pages of the document to be displayed from one page to another in sequence on the basis of the amount of the entire document to be displayed and the obtained position of the one point; and
when the action judging unit judges that the action by the contact with or approach to the operation surface of the touch panel is the first predetermined action, the display control unit controls the touch panel so as to display the document to be displayed to the automatic page-turning end page determined by the operation determining unit.

3. The electronic apparatus according to claim 1,
wherein the action judging unit further judges whether the action by the contact with or approach to the operation surface of the touch panel has changed from the first predetermined action to a second predetermined action;
when the action judging unit judges that the action by the contact with or approach has changed from the first predetermined action to the second predetermined action, the operation determining unit determines to redisplay a page displayed before the start of the automatic page-turning; and
the display control unit controls the touch panel so as to display the page determined by the operation determining unit.

4. The electronic apparatus according to claim 1,
wherein the first predetermined action is an action in which the position of one of the plurality of points is fixed and the position of at least one of the other points is changed; and
the one point is at least one of the plurality of points other than the fixed one point.

5. The electronic apparatus according to claim 1,
wherein the touch panel displays a scrollbar and displays a pointer in a position representing a relative position of a currently displayed page of the document to be displayed on the scrollbar; and
the predetermined position is the position of the pointer.

6. The electronic apparatus according to claim 1,
wherein the action judging unit judges whether the distance between the plurality of points is greater than or smaller than the distance between the plurality of points before the change in the distance between the plurality of points; and
the operation determining unit determines a direction of the page change in accordance with the result of the judgment by the action judging unit about whether the distance between the plurality of points is greater or smaller.

7. The electronic apparatus according to claim 1,
wherein the action judging unit further judges whether or not the action by the contact or the approach is a particular action specifying speed of the automatic page-turning;
the operation determining unit further determines speed for the automatic page-turning on the basis of position information acquired by the touch panel when the action judging unit judges that the action by the contact or the approach is the particular action specifying the speed of the automatic page-turning; and
the display control unit displays display pages of the document to be displayed from one page to another in sequence at the automatic page-turning speed determined by the operation determining unit.

8. The electronic apparatus according to claim 1,
wherein the storage unit further stores page speed determination information in which position information indicating contact with or approach to the touch panel and speeds of automatic page-turning are associated with each other; and
the operation determining unit determines the speed for the automatic page-turning on the basis of position information acquired by the touch panel and the page speed determination information.

9. A document display method comprising:
acquiring position information indicating the position of contact with or approach to an operation surface of a touch panel in every period divided by predetermined intervals;
storing the position information acquired in the acquiring and information indicating a history of the position information;
judging whether or not an action by the contact with or the approach to the operation surface of the touch panel is a first predetermined action that changes a distance between the plurality of points on the basis of position information indicating each of the plurality of points and information indicating the history of the position information when position information indicating a plurality of points including contact with or approach to a predetermined position is acquired in the acquiring;
obtaining the position of one of the plurality of points before a change in the distance between the plurality of points on the basis of position information and information indicating the history of the position information stored in the storing when it is judged in the judging that the action by the contact with or the approach to the operation surface of the touch panel is the first predetermined action, and determining a start page of automatic page-turning changing display pages of the document to be displayed from one page to another in sequence on the basis of the amount of the entire document to be displayed and the obtained position of the one point; and
when it is judged in the judging that the action by the contact with or approach to the operation surface of the touch panel is the first predetermined action, causing the touch panel to display the display pages of the document to be displayed in sequence starting at the start page determined in the obtaining.

10. A non-transitory computer-readable recording medium on which a program is recorded, the program causing a computer to implement:
a position input function of acquiring position information indicating the position of contact with or approach to an operation surface of a touch panel in every period divided by predetermined intervals;

a display function of displaying a document to be displayed on the touch panel;

a storage function of storing the position information acquired by the position input function and information indicating a history of the position information;

an action judging function of judging whether or not an action by the contact with or the approach to the operation surface of the touch panel is a first predetermined action that changes a distance between the plurality of points on the basis of position information indicating each of the plurality of points and information indicating the history of the position information when the position input function acquires position information indicating a plurality of points including contact with or approach to a predetermined position is acquired;

an operation determining function of obtaining the position of one of the plurality of points before a change in the distance between the plurality of points on the basis of position information and information indicating the history of the position information stored by the storage function when the action judging function judges that the action by the contact with or the approach to the operation surface of the touch panel is the first predetermined action, and determining a start page of automatic page-turning changing display pages of the document to be displayed from one page to another in sequence on the basis of the amount of the entire document to be displayed and the obtained position of the one point; and when the action judging function judges that the action by the contact with or approach to the operation surface of the touch panel is the first predetermined action, a function of causing the touch panel to display the display pages of the document to be displayed in sequence starting at the start page determined by the operation determining function.

* * * * *